US008731276B2

(12) United States Patent
Mizutani et al.

(10) Patent No.: US 8,731,276 B2
(45) Date of Patent: May 20, 2014

(54) MOTION SPACE PRESENTATION DEVICE AND MOTION SPACE PRESENTATION METHOD

(75) Inventors: Kenji Mizutani, Kyoto (JP); Taichi Sato, Kyoto (JP)

(73) Assignee: Panasonic Corporation, Osaka (JP)

(*) Notice: Subject to any disclaimer, the term of this patent is extended or adjusted under 35 U.S.C. 154(b) by 378 days.

(21) Appl. No.: 13/220,749

(22) Filed: Aug. 30, 2011

(65) Prior Publication Data

US 2011/0311127 A1 Dec. 22, 2011

Related U.S. Application Data

(63) Continuation of application No. PCT/JP2010/007167, filed on Dec. 9, 2010.

(30) Foreign Application Priority Data

Dec. 28, 2009 (JP) ................................. 2009-297790

(51) Int. Cl.
*G06K 9/00* (2006.01)
(52) U.S. Cl.
USPC ........................... 382/153; 345/633; 700/245
(58) Field of Classification Search
USPC .......... 382/153, 154; 345/629, 530, 632, 633, 345/641; 700/245
See application file for complete search history.

(56) References Cited

U.S. PATENT DOCUMENTS 5,706,195 A * 1/1998 Corby et al. ...................... 701/2
5,745,387 A * 4/1998 Corby et al. ...................... 703/1
7,298,385 B2 11/2007 Kazi et al.
7,714,895 B2 5/2010 Pretlove et al.
8,494,677 B2 * 7/2013 Mizutani ...................... 700/250
2003/0012410 A1 * 1/2003 Navab et al. ................... 382/103
2004/0189631 A1 9/2004 Kazi et al.
2004/0189675 A1 9/2004 Pretlove et al.
2004/0227816 A1 11/2004 Sato et al.

(Continued)

FOREIGN PATENT DOCUMENTS

CN   1538355    10/2004
CN   101512452   8/2009

(Continued)

OTHER PUBLICATIONS

International Search Report issued Feb. 22, 2011 in International (PCT) Application No. PCT/JP2010/007167.

(Continued)

*Primary Examiner* — Samir Ahmed
(74) *Attorney, Agent, or Firm* — Wenderoth, Lind & Ponack, LLP.

(57) ABSTRACT

A motion space presentation device includes: a work area generation unit configured to generate a three-dimensional region in which the movable robot operates; an image capture unit configured to capture a real image; a position and posture detection unit configured to detect an image capture position and an image capture direction of the image capture unit; and an overlay unit configured to selectively superimpose either an image of a segment approximation model of the movable robot as viewed in the image capture direction from the image capture position, or an image of the three-dimensional region as viewed in the image capture direction from the image capture position, on the real image captured by the image capture unit, according to the difficulty in recognizing each image.

18 Claims, 27 Drawing Sheets

(56) References Cited

U.S. PATENT DOCUMENTS

| | | |
|---|---|---|
| 2005/0055134 A1 | 3/2005 | Okuda et al. |
| 2006/0025889 A1 | 2/2006 | Katsumata |
| 2006/0195226 A1 | 8/2006 | Matsukawa et al. |
| 2009/0096790 A1* | 4/2009 | Wiedemann et al. ......... 345/427 |
| 2009/0222134 A1 | 9/2009 | Franke et al. |
| 2010/0137880 A1* | 6/2010 | Nahum et al. ................ 606/130 |

FOREIGN PATENT DOCUMENTS

| | | |
|---|---|---|
| EP | 1 435 280 | 7/2004 |
| EP | 1 457 730 | 9/2004 |
| JP | 01-162904 | 6/1989 |
| JP | 04-004306 | 1/1992 |
| JP | 11-237902 | 8/1999 |
| JP | 11-254360 | 9/1999 |
| JP | 2004-160588 | 6/2004 |
| JP | 2004-209641 | 7/2004 |
| JP | 2004-213673 | 7/2004 |
| JP | 2004-243516 | 9/2004 |
| JP | 2005-081445 | 3/2005 |
| JP | 2006-035408 | 2/2006 |
| JP | 2006-113858 | 4/2006 |
| JP | 2009-098982 | 5/2009 |
| JP | 2009-123045 | 6/2009 |
| WO | 2009/063318 | 5/2009 |

OTHER PUBLICATIONS

Chinese Office Action, issued Feb. 26, 2014 (with English translation) in a Chinese application that is a foreign counterpart to the present application.

* cited by examiner

FIG. 7

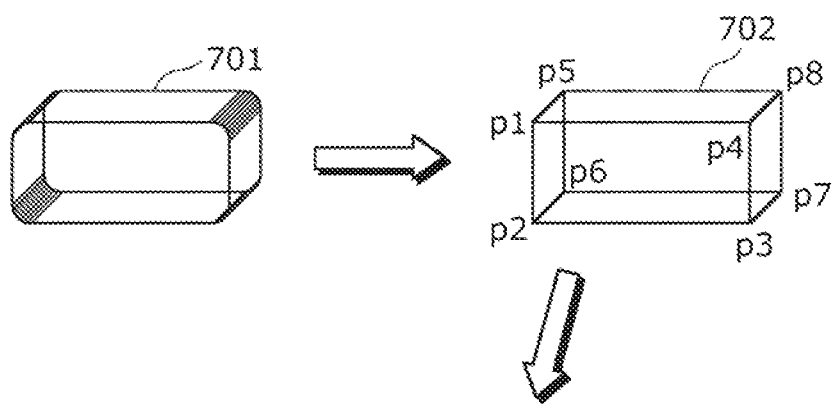

```
<polygons>
<line start= "p1" end= "p2" attr = "body " />
<line start= "p2" end= "p3" attr = "body " />
<line start= "p3" end= "p4" attr = "body " />
<line start= "p4" end= "p1" attr = "body " />
<line start= "p5" end= "p6" attr = "body " />
<line start= "p6" end= "p7" attr = "body " />
<line start= "p7" end= "p8" attr = "body " />
<line start= "p8" end= "p5" attr = "body " />
<line start= "p1" end= "p5" attr = "body " />
<line start= "p2" end= "p6" attr = "body " />
<line start= "p3" end= "p7" attr = "body " />
<line start= "p4" end= "p8" attr = "body " />
</polygons>
```

FIG. 12

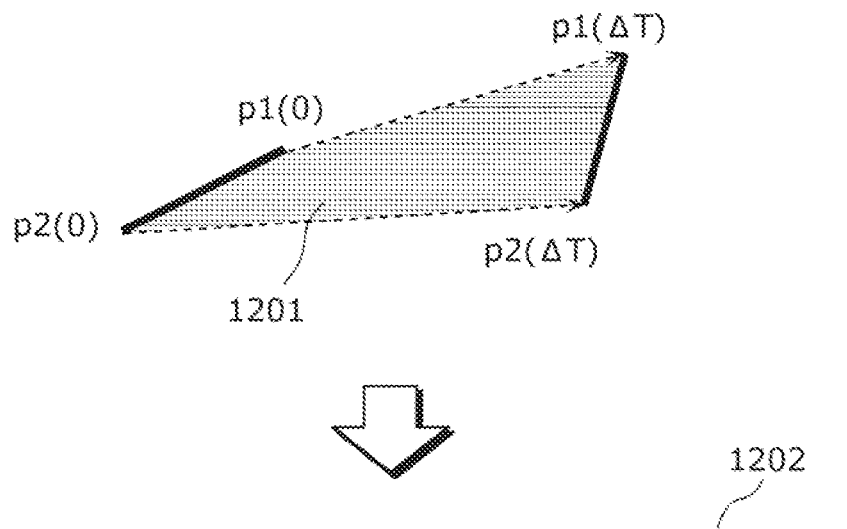

```
<polygons color= "red" time= "00:00:00" >
<polygon start= "0" end= "ΔT" >
<line start= "p1(0)" end= "p2(0)" attr = "body" />
<line start= "p1(0)" end= "p1(ΔT)" attr = "traj" />
<line start= "p2(0)" end= "p2(ΔT)" attr = "traj" />
<line start= "p1(ΔT)" end= "p2(ΔT)" attr = "body" />
</polygon>
</polygons>
<polygons color= "yellow" time= "00:00:00" >
<polygon start= "0 " end= "ΔT " >
<line start= "p1(0)" end= "p2(0)" attr = "body " />
<line start= "p1(0)" end= "p1(ΔT)" attr = "traj " />
<line start= "p2(0)" end= "p2(ΔT)" attr = "traj " />
<line start= "p1(ΔT)" end= "p2(ΔT)" attr = "body " />
</polygon>
</polygons >
```

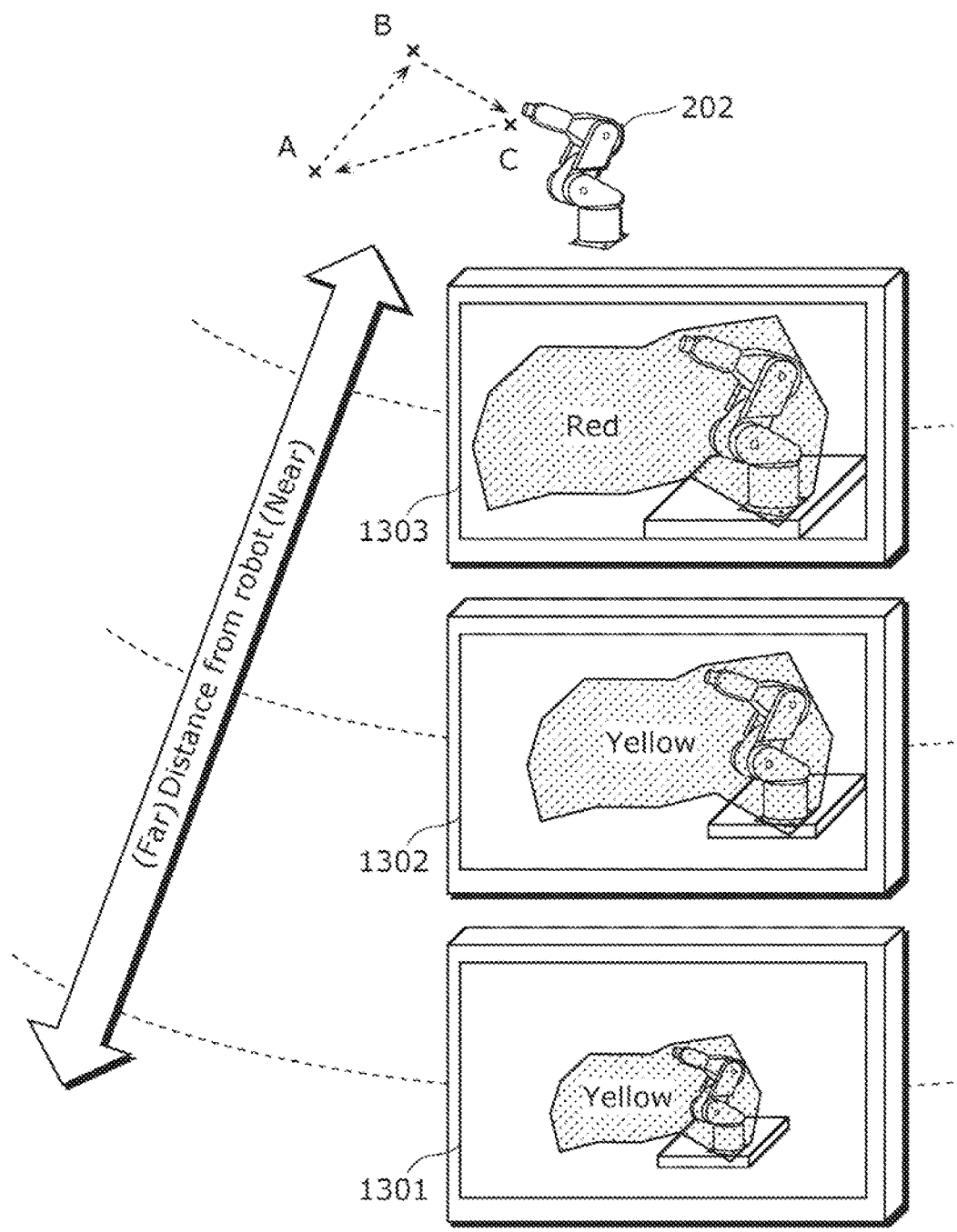

FIG. 14
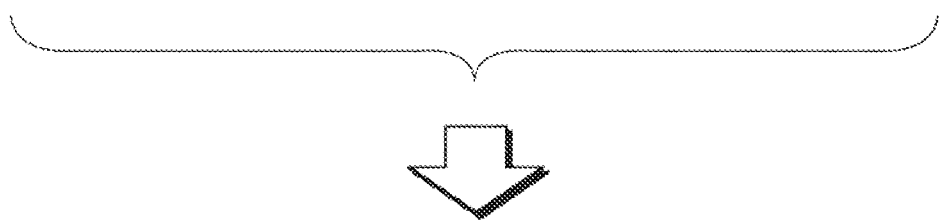
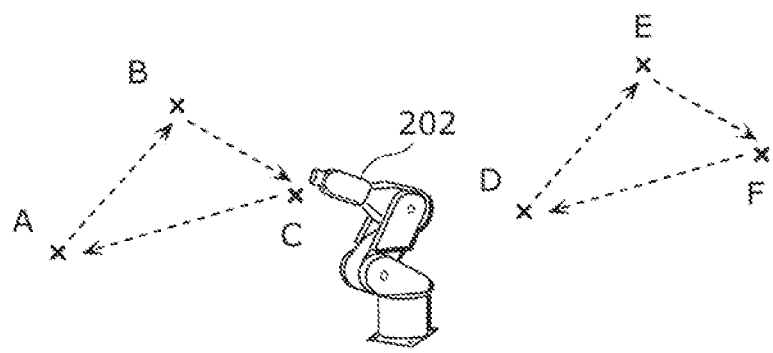

Separation of operation mode

Separation of operation mode

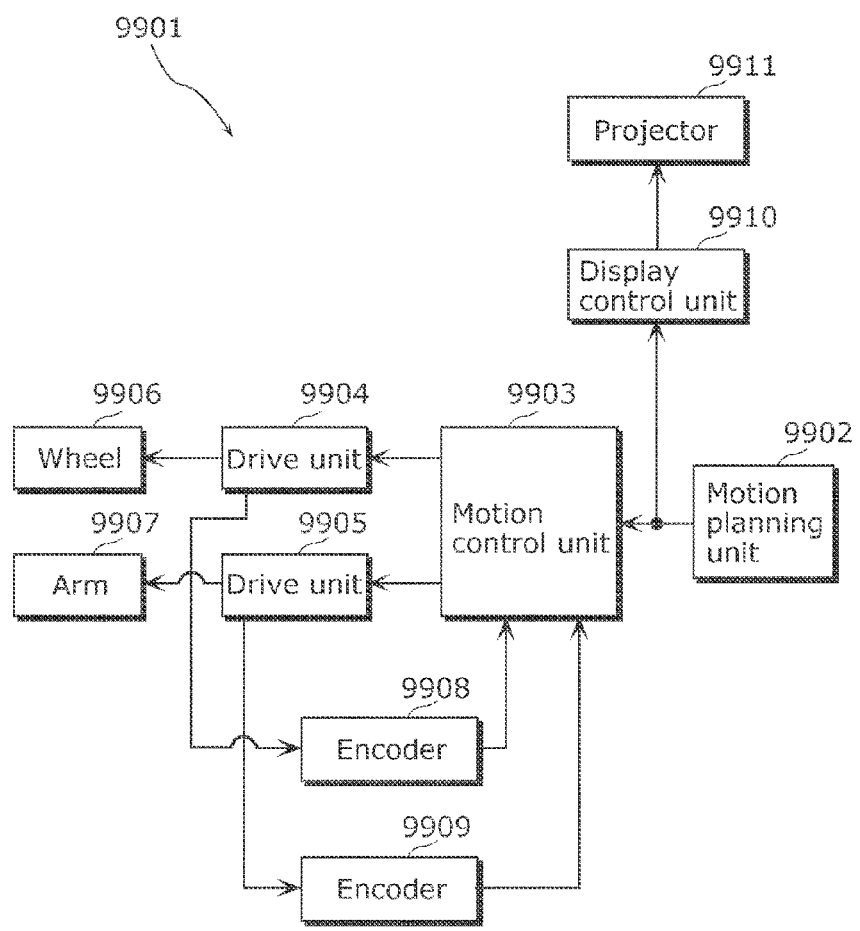
FIG. 27 - PRIOR ART

MOTION SPACE PRESENTATION DEVICE AND MOTION SPACE PRESENTATION METHOD

CROSS REFERENCE TO RELATED APPLICATION

This is a continuation application of PCT application No. PCT/JP2010/007167 filed on Dec. 9, 2010, designating the United States of America.

BACKGROUND OF THE INVENTION (1) Field of the Invention

The present invention relates to a motion space presentation device and a motion space presentation method which generate data for presenting the motion space of a movable robot which operates according to a motion planning.

(2) Description of the Related Art

Conventional robots have a sufficient dedicated motion space into which workers are prohibited from accessing. However, in recent years, robots for performing a task while sharing space with people, such as a housekeeping robot and a double arm robot for cell production are increasing in number.

When a worker works in close proximity to such a robot, the worker may come into contact with the robot and may get injured unless the worker properly perceives the motion space of the robot. Even when the worker does not get injured, the idling time of the robot may increase, or the task being performed by the robot may fail because of an emergency stop of the robot.

In order to avoid such trouble, the movable robot disclosed by Japanese Unexamined Patent Application Publication No. 2009-123045 (hereinafter referred to as Patent Reference 1) projects a dangerous area on a floor surface on which a movable robot operates, thereby presenting a dangerous area to achieve smooth operation of the robot.

FIG. 27 is a diagram showing the overall configuration of the movable robot shown in Patent Reference 1.

A motion planning unit 9902 determines the motion of a movable robot 9901.

A motion control unit 9903 calculates the information for driving a wheel 9906 based on the determined motion and the information of the wheel 9906 measured by an encoder 9908. A drive unit 9904 drives the wheel 9906 based on the calculated information. In addition, the motion control unit 9903 calculates the information for driving an arm 9907 based on the determined motion and the information of the arm 9907 measured by an encoder 9909. A drive unit 9905 drives the arm 9907 according to the calculated information.

In this manner, the movable robot 9901 operates and/or operates the arm 9907. Based on the determined motion, a display control unit 9910 determines the dangerous area in which the movable robot 9901 may move and/or operate. A projector 9911 projects the determined dangerous area on the floor surface on which the movable robot 9901 moves, thereby presenting the dangerous area to achieve smooth operation of the robot.

SUMMARY OF THE INVENTION

However, the movable robot shown in Patent Reference 1 cannot present height information of the dangerous area.

For example, in the case of an arm robot, it is difficult to determine the height of the space to be occupied by the arm robot only by projecting the space on the installation surface of the arm robot. Even in the case where the motion space occupied by the arm robot is at least 60 cm above the installation surface, the method shown in Patent Reference 1 determines that all points along the height above the installation surface are included in the motion space. Therefore, space which is not occupied by the arm robot is also determined to be unusable space.

Also, in the case where the arm robot operates at high speed, the image of the arm robot projected by the projector on the installation surface of the arm robot also moves at high speed. Furthermore, in the case where the installation surface on which the image is projected by the projector is curved, the projected image may be deformed so that the motion space may be erroneously determined.

Consequently, it is difficult for a worker to intuitively determine the entire motion space of the arm robot by observing the image projected on the installation surface. Thus, it is an object of the present invention to provide a motion space presentation device that generates data for displaying the motion space of a robot three-dimensionally.

In order to solve the aforementioned problems, the motion space presentation device which generates data for presenting a motion space of a movable robot, according to one aspect of the present invention includes: a work area generation unit configured to generate a three-dimensional region in which the movable robot operates; an image capture unit configured to capture a real image; a position and posture detection unit configured to detect an image capture position which is a position of the image capture unit, and to detect an image capture direction of the image capture unit; and an overlay unit configured to selectively superimpose either a segment approximation model image or a work area image on the real image captured by the image capture unit, according to difficulty in recognizing each image, the segment approximation model image being an image of a segment approximation model of the movable robot, as viewed in the image capture direction from the image capture position, and the work area image being an image of the three-dimensional region, as viewed in the image capture direction from the image capture position.

Thus, the motion space presentation device can generate data for three-dimensionally displaying the motion space of a movable robot which operates according to a motion planning. Also, appropriate data for the display is generated by selectively superimposing data based on the difficulty in recognition.

Also, the overlay unit may be configured to superimpose the segment approximation model image on the real image when the overlay unit evaluates that the work area image is difficult to be recognized according to criteria for evaluating the difficulty in recognition.

Thus, when a work area image is difficult to recognize, a segment approximation model image is superimposed. Therefore, appropriate data for display is generated.

Also, the work area generation unit may include: a segment approximation model holding unit configured to hold the segment approximation model of the movable robot; a motion simulator configured to simulate a movement of the segment approximation model in a virtual space according to a motion planning for operating the movable robot; and a three-dimensional region generation unit configured to generate the three-dimensional region in which the movable robot operates, based on a result obtained by simulating the movement of the segment approximation model by the motion simulator.

Thus, the motion space presentation device generates a three-dimensional region as the motion space of a movable robot using the segment approximation model thereof. Consequently, the motion space presentation device can reduce computational processing.

Also, the overlay unit may be configured to superimpose either the segment approximation model image or the work area image on the real image according to at least one of smoothness of the three-dimensional region and a distance between the image capture position and the position of the movable robot, the segment approximation model image being an image of the segment approximation model simulated by the motion simulator, as viewed in the image capture direction from the image capture position.

Thus, the motion space presentation device can express a more easily-recognized image according to the smoothness of or the distance from the three-dimensional region.

Also, the overlay unit may be configured to superimpose the segment approximation model image on the real image, and the overlay unit, when estimating that the three-dimensional region has a smooth surface, and to superimpose the work area image on the real image when estimating that the three-dimensional region has no smooth surface.

Thus, in the case where the motion space is smooth and unclear, the segment approximation model is used to display a more easily-recognized image.

Also, the overlay unit is configured to superimpose the segment approximation model image on the real image when the distance between the image capture position and the position of the movable robot satisfies a predetermined condition, and to superimpose the work area image on the real image when the distance between the image capture position and the position of the movable robot does not satisfy the predetermined condition.

Thus, in the case where the image is unclear due to a short distance between the image capture unit and the motion space, the segment approximation model is used to display a more easily-recognized image.

Also, the motion space presentation device may further include a region expression adjustment unit configured to change an expression form of the three-dimensional region generated by the work area generation unit.

Thus, the expression form of the motion space is changed to a more easily-recognized expression form.

Also, the region expression adjustment unit may be configured to change an expression form of a two-dimensional plane constituting the three-dimensional region based on an amount of movement of the movable robot per unit of time during which the movable robot operates in the three-dimensional region according to the motion planning.

Thus, the expression form of the motion space is changed according to the moving speed. For example, the motion space presentation device can express that a portion in the motion space with a higher speed is more dangerous.

Also, the region expression adjustment unit may be configured to change an expression form of a two-dimensional plane constituting the three-dimensional region according to a difference in modes differentiated in the motion planning.

Thus, the motion space presentation device can express the motion space in each mode.

Also, the overlay unit may be further configured to superimpose an execution sequence of the mode on at least one of the work area image and the real image, the execution sequence being determined according to the motion planning.

Thus, the motion space presentation device can express the order in which the motion space is partially occupied in each mode.

Also, the overlay unit may be further configured to superimpose a scheduled completion time of the mode currently executed on at least one of the work area image and the real image.

Thus, the motion space presentation device can express that the space other than the partial motion space occupied by the motion space presentation device in the mode currently executed is available until the scheduled completion time.

Also, when the distance between the image capture position and the position of the movable robot is a second length shorter than a first length, the overlay unit is configured to reduce a transparency of the work area image to less than another transparency of the work area image when the distance between the image capture position and the position of the movable robot is the first length, and to superimpose the work area image on the real image.

Thus, the motion space presentation device can express the proximity to the motion space. Also, the motion space presentation device can express that a dangerous area is in the proximity by lowering the transparency of the workspace.

Also, the work area generation unit may be configured to generate the three-dimensional region by associating a partial region in which the movable robot operates in the three-dimensional region with a time at which the movable robot operates in the three-dimensional region, the overlay unit being configured to extract the partial region from the three-dimensional region, the partial region in which the movable robot operates after current time, and to superimpose an image of the extracted partial region as the work area image on the real image, the image of the extracted partial region as viewed in the image capture direction from the image capture position.

Thus, the motion space presentation device can previously generate a three-dimensional region based on a motion planning, which is the motion space of the movable robot. Consequently, the motion space presentation device can reduce computational processing in the superimposition.

Also, the position and posture detection unit is configured to detect the image capture position and the image capture direction by a visual tag captured by the image capture unit, the visual tag indicating a position.

Thus, the motion space presentation device can detect the image capture position and direction of the image capture unit without using a position sensing device or a posture sensing device.

Also, the motion space presentation device may further include a display unit configured to move integrally with the image capture unit, wherein the display unit is configured to display the work area image which is superimposed on the real image by the overlay unit.

Thus, the motion space presentation device can display a superimposed image without using an external display means. Also, the image capture unit moves integrally with the display unit, and thus an image is naturally displayed on the display unit.

Also, the motion space presentation device may further include a motion planning holding unit configured to hold a motion planning for operating the movable robot, wherein the work area generation unit is configured to generate the three-dimensional region according to the motion planning held by the motion planning holding unit.

Thus, the motion space presentation device can obtain the motion planning of a movable robot without using communication means such as a network.

Also, a motion space presentation method for generating data for presenting a motion space of a movable robot, according to one aspect of the present invention includes:

generating a three-dimensional region in which the movable robot operates; detecting an image capture position which is a position of an image capture unit, and detecting an image capture direction of the image capture unit; and selectively superimposing either a segment approximation model image or a work area image on the real image captured by the image capture unit, according to difficulty in recognizing each image, the segment approximation model image being an image of a segment approximation model of the movable robot, as viewed in the image capture direction from the image capture position, and the work area image being an image of the three-dimensional region as viewed in the image capture direction from the image capture position.

Thus, there is generated the data for three-dimensionally displaying the motion space of a movable robot which operates according to a motion planning. Also, appropriate data for the display is generated by selectively superimposing data based on the difficulty in recognition.

Also, a non-transitory computer-readable recording medium in which a program to generate data for presenting a motion space of a movable robot is recorded, the program causing a computer to execute: generating a three-dimensional region in which the movable robot operates; detecting an image capture position which is a position of an image capture unit, and detecting an image capture direction of the image capture unit; and selectively superimposing either a segment approximation model image or a work area image on the real image captured by the image capture unit, according to difficulty in recognizing each image, the segment approximation model image being an image of a segment approximation model of the movable robot, as viewed in the image capture direction from the image capture position, and the work area image being an image of the three-dimensional region as viewed in the image capture direction from the image capture position.

Thus, the motion space presentation method is achieved as a recording medium where a program is recorded, the program causing a computer to execute the motion space presentation method.

In accordance with the present invention, the data for three-dimensionally displaying the motion space of a robot can be generated.

The disclosure of Japanese Patent Application No. 2009-297790 filed on Dec. 28, 2009 including specification, drawings and claims is incorporated herein by reference in its entirety. The disclosure of PCT application No. PCT/JP2010/007167 filed on Dec. 9, 2010, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiments of the invention. In the Drawings:

FIG. 7 shows an example of a segment approximation model in Embodiment 1;

FIG. 12 shows an example of an operation of a region expression adjustment unit in Embodiment 2;

FIG. 13 shows an example of a motion space displayed on a motion space presentation device in Embodiment 2;

FIG. 14 shows an example of a motion planning of a motion planning holding unit in Embodiment 3;

FIG. 27 shows a functional block diagram of a device in conventional art for showing a dangerous area.

DESCRIPTION OF THE PREFERRED EMBODIMENTS

An embodiment of the present invention is described hereinafter with reference to the accompanying drawings.

Embodiment 1

Figure 1:
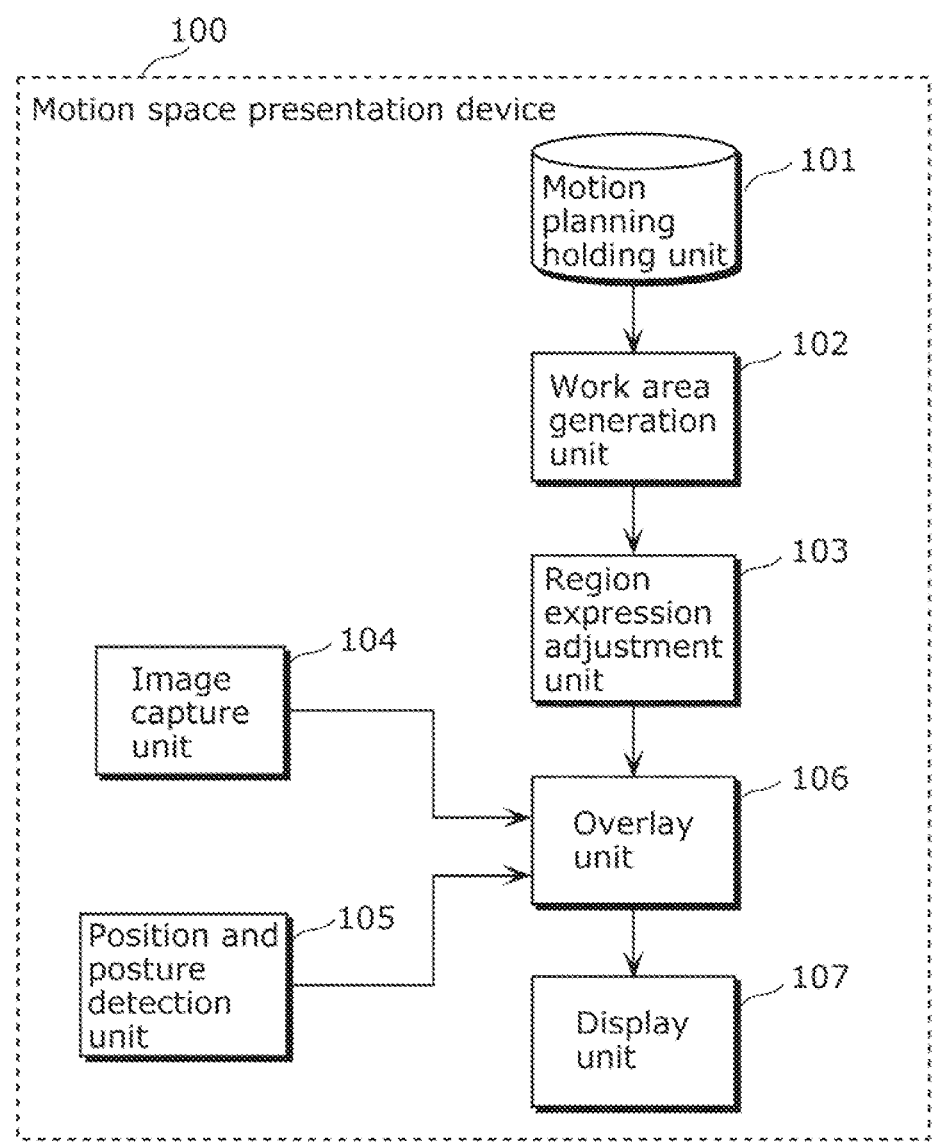
FIG. 1 shows a functional block diagram of a motion space presentation device in Embodiment 1.

FIG. 1 is a functional block diagram of a motion space presentation device in Embodiment 1.

A motion planning holding unit 101 of FIG. 1 holds the motion planning of movable robots such as an arm robot. A work area generation unit 102 generates a three-dimensional region, as the motion space of a movable robot, from a motion planning held by the motion planning holding unit 101. A region expression adjustment unit 103 deforms the generated three-dimensional region or processes the texture of two-dimensional planes constituting the three-dimensional region so that it can be easily recognized.

An image capture unit 104 captures a real world image. A position and posture detection unit 105 detects a position and a posture of the image capture unit 104 in the real world. An overlay unit 106 extracts a partial region from the three-dimensional region outputted by the region expression adjustment unit 103, the partial region to be occupied by the movable robot after the current time, and superimposes the partial region on the two-dimensional plane of the real world image using the view from the image capture unit 104. A display unit 107 constitutes a display means for a worker to recognize the partial three-dimensional region.

The work area generation unit 102 and the region expression adjustment unit 103 complete their processing before a movable robot starts its operation. After the movable robot starts its operation, the overlay unit 106 displays the three-dimensional region corresponding to the motion space of the movable robot on the display unit 107 according to the position and posture of the image capture unit 104, and the elapsed time of the operation of the movable robot. Thus, the motion space presentation device 100 shows a user the motion space of the movable robot. The work area generation unit 102 and the region expression adjustment unit 103 may perform processing in parallel to the operation of the movable robot.

Figure 2:
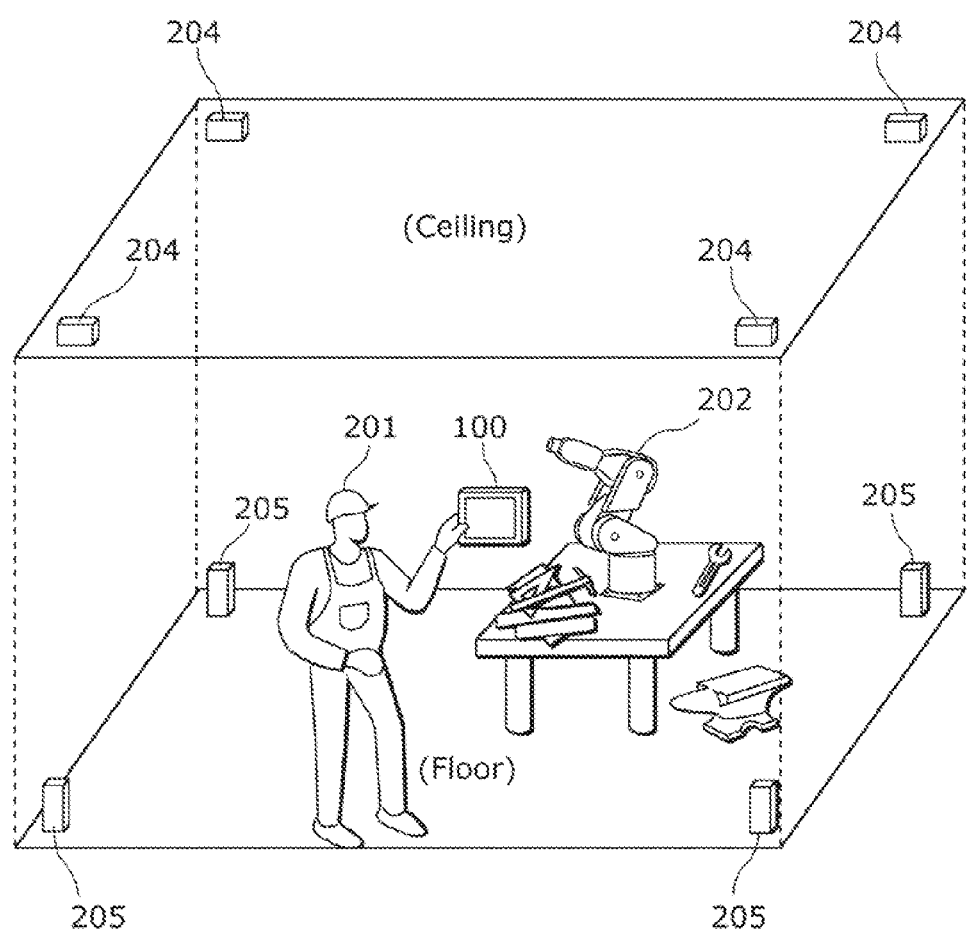
FIG. 2 shows how the motion space presentation device in Embodiment 1 is used.

FIG. 2 shows how the motion space presentation device shown in FIG. 1 is used.

The motion space presentation device 100 is used in an environment where a worker 201 and a movable robot 202 perform their tasks in close proximity to each other. The motion planning holding unit 101, the work area generation unit 102, the region expression adjustment unit 103, and the overlay unit 106 are mounted on the motion space presentation device 100 as electronic circuits thereof. The image capture unit 104 and the display unit 107 are mounted on the surface of the motion space presentation device 100.

The position and posture detection unit 105 detects the image capture position and direction of the image capture unit 104 with a sensing device mounted on the motion space presentation device 100 and a sensing device installed in the work environment. In Embodiment 1, a plurality of position sensing devices 204 are installed on the ceiling as the sensing devices in the work environment, and a plurality of posture sensing devices 205 are installed on the floor.

Figure 3:
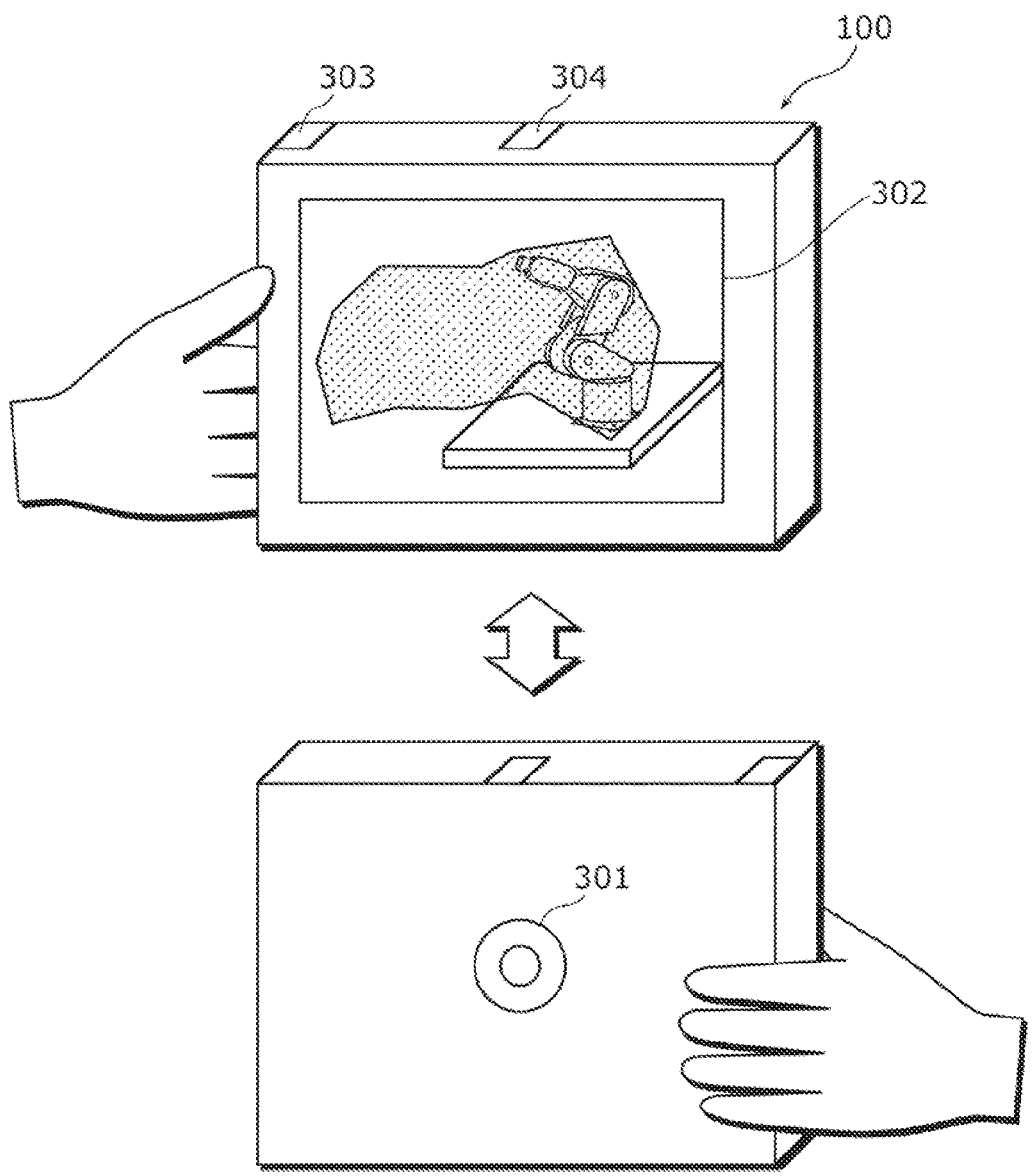
FIG. 3 shows the appearance of the motion space presentation device in Embodiment 1.

FIG. 3 shows the appearance of the motion space presentation device 100 shown in FIG. 1.

The motion space presentation device 100 is achieved as a display terminal which includes a camera 301 for capturing a real image, and a display screen 302 for displaying an image created by, superimposing a three-dimensional region on the real image. The image capture unit 104 shown in FIG. 1 is implemented by mounting e.g., the camera 301. The display unit 107 shown in FIG. 1 is implemented by mounting e.g., the display screen 302.

The display screen 302 may be achieved with the size of a device such as a cellular phone or PDA (Personal Digital Assistant), which can be held by the worker 201 in his/her hand. Also, the display screen 302 has the size on the order of the size of an eyeglass lens, and may be achieved as a head mount display with ocular lenses being attached.

A position sensing device 303 is a position sensing device of the motion space presentation device 100, and detects the position thereof in the real world by cooperating with the position sensing device 204 in the work environment. The position sensing device 303 of the motion space presentation device 100, and the position sensing device 204 in the work environment achieve position detection by, for example, a publicly known indoor GPS (Global Positioning System) utilizing UWB (Ultra Wide Band).

Also, a posture sensing device 304 is a posture sensing device of the motion space presentation device 100, and detects the posture thereof by cooperating with the posture sensing device 205 in the work environment. The posture sensing device 304 of the motion space presentation device 100 and the posture sensing device 205 in the work environment achieve posture detection by utilizing, for example, a publicly known three-dimensional tilt sensor using magnetism.

Because the motion space presentation device 100 and the image capture unit 104 are integrated, the position and posture of the motion space presentation device 100 can be replaced by the image capture position and direction of the image capture unit 104 shown in FIG. 1, respectively. Here, the image capture position means the position of the image capture unit 104 itself. Also, the term "image capture direction" means the direction from the image capture unit 104 to a subject.

Figure 4:
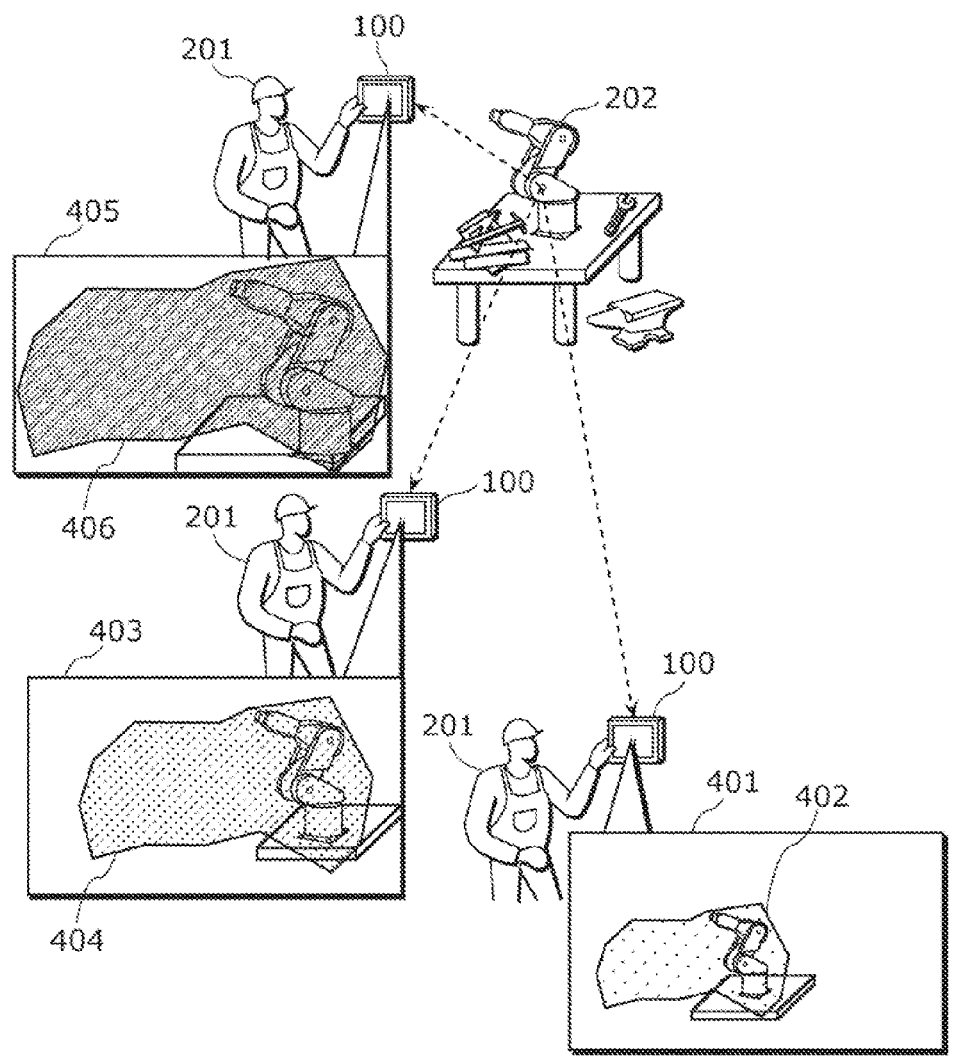
FIG. 4 shows an example of display content of the motion space presentation device in Embodiment 1.

FIG. 4 shows an example of display content of the motion space presentation device 100 in Embodiment 1.

The worker 201 can intuitively recognize the motion space of the movable robot 202 by observing the movable robot 202 via the motion space presentation device 100. For example, in the case where the distance between the worker 201 and the movable robot 202 is long, a display content 401 is displayed on the display screen 302. A motion space 402 in the display content 401 is the motion space of the movable robot 202.

On the other hand, in the case where the distance between the worker 201 and the movable robot 202 becomes short, a display content 403, for example, is displayed on the display screen 302. In this case, due to the short distance between the worker 201 and the movable robot 202, a motion space 404 of the movable robot 202 is displayed in a larger size than the motion space 402.

Furthermore, when the distance becomes much shorter, a display content 405, for example, is displayed on the display screen 302. Due to much shorter distance between the worker 201 and the movable robot 202, a motion space 406 of the movable robot 202 is displayed in a larger size than the motion space 404. Now, when the motion space is displayed in a larger size, the worker 201 may find it difficult to distinguish the motion space from the rest of the motion space. For this reason, in this example, the motion space presentation device 100 shows the worker 201 the motion space more clearly by lowering the transparency of motion space.

That is to say, in the case where the distance between the image capture position and the movable robot 202 is a second length shorter than a first length, the overlay unit 106 of the motion space presentation device 100 reduces the transparency of the work area image to a lower level than in the case of the first length, the work area image indicating the motion space of the motion space presentation device 100. The overlay unit 106 then superimposes the work area image having lowered transparency on the real image.

Figure 5:
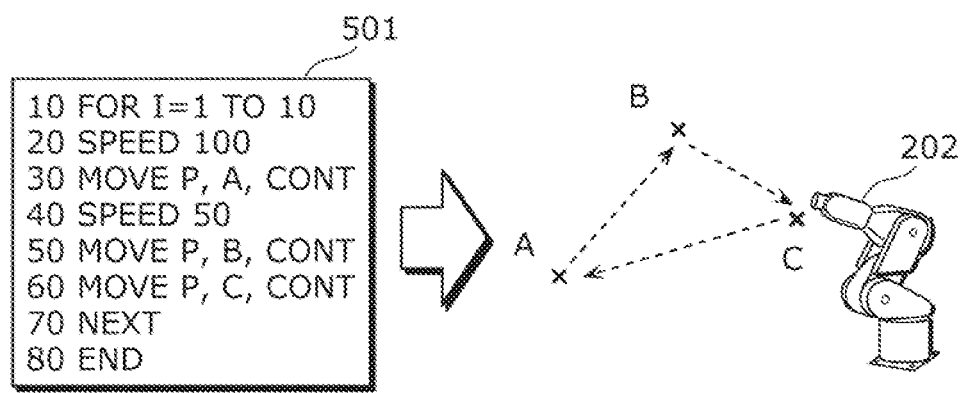
FIG. 5 shows an example of a motion planning of a motion planning holding unit in Embodiment 1.

FIG. 5 shows an example of a motion planning held by the motion planning holding unit 101 shown in FIG. 1.

A motion planning 501 shown in FIG. 5 is described by SLIM (Standard Language for Industrial Manipulator) which is an industrial robot language in accordance with JIS. The languages for manipulating a robot has a large variation ranging from a language with a standardized specification to a language designed for a specific robot. The motion planning 501 may be described by a language specification other than SLIM. The present invention can be practiced even with another language.

The operation based on the motion planning 501 is as follows. That is to say, in the case where the motion planning 501 is executed when the end of the movable robot 202 is located at a spatial position C, the end of the movable robot 202 moves to a spatial position A with a speed of 100. Next, the end of the movable robot 202 sets the speed to half of the previous speed, i.e., 50, and moves to a spatial position B, then to the spatial position C. The end of movable robot 202 sequentially repeats the operation of moving to the spatial position A, to the spatial position B, and to the spatial position C for 10 times.

Figure 6:
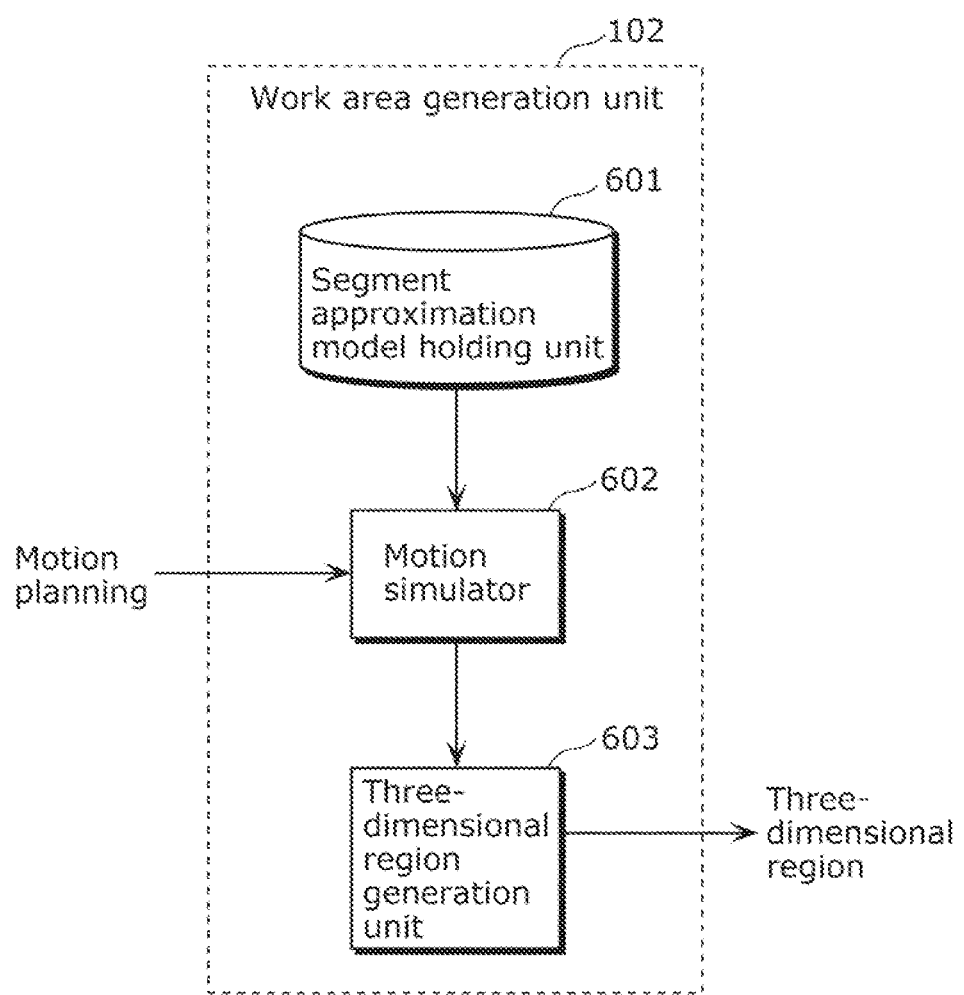
FIG. 6 shows a functional block diagram of a work area generation unit in Embodiment 1.

FIG. 6 is a functional block diagram of the work area generation unit 102 shown in FIG. 1. The shape of the movable robot 202 is expressed by approximated line segments, and is stored in a segment approximation model holding unit 601 as a segment approximation model (also referred to as a linear approximation model or a piecewise linear approximation model).

FIG. 7 shows an example of the segment approximation model in Embodiment 1.

A shape 701 of an actual robot is generally not linear, but has many curved surfaces in consideration of safety and light weight. The motion space presentation device 100 can express more precisely the motion space to be shown to the worker 201 by utilizing mathematical expressions for curved surfaces. However, the computation of the shape of a robot based on the mathematical expressions for curved surfaces has a problem in that required computational complexity tends to increase. For this reason, the actual robot shape 701 is, for example, pre-converted to an approximation model like a segment approximation model 702 expressed by a plurality of line segments approximating the actual robot shape 701.

The segment approximation model 702 is an example of a segment approximation model, and is the minimum polyhedron that can contain the actual robot shape 701. The segment approximation model 702 is expressed by, for example, an internal format for segment approximation model 703. The internal format for segment approximation model 703 is expressed by XML (Extensible Markup Language) as a set of line segments constituting a polyhedron.

In the internal format for segment approximation model 703, a line segment is expressed by a <line> tag. Also, a "start" attribute indicates the starting point of a line segment, and an "end" attribute indicates the terminal point of a line segment. An "attr" attribute of "body" indicates that a line segment is one of the line segments constituting the shape of the movable robot 202, and the "attr" attribute of "traj" indicates that a line segment is a trajectory of a motion. Also, a set of line segments is expressed by a <polygons> tag. Actually, three-dimensional coordinate values having a unit are stored in p1 to p8 of the internal format for segment approximation model 703 shown in FIG. 7.

The motion simulator 602 shown in FIG. 6 simulates the movement by a segment approximation model in a virtual space based on the motion planning held by the motion planning holding unit 101, the segment approximation model being held in the segment approximation model holding unit 601. A three-dimensional region generation unit 603 samples the motion of the movable robot 202 with a constant time interval ΔT, and generates and outputs a three-dimensional region as the motion space of the movable robot 202.

Figure 8:
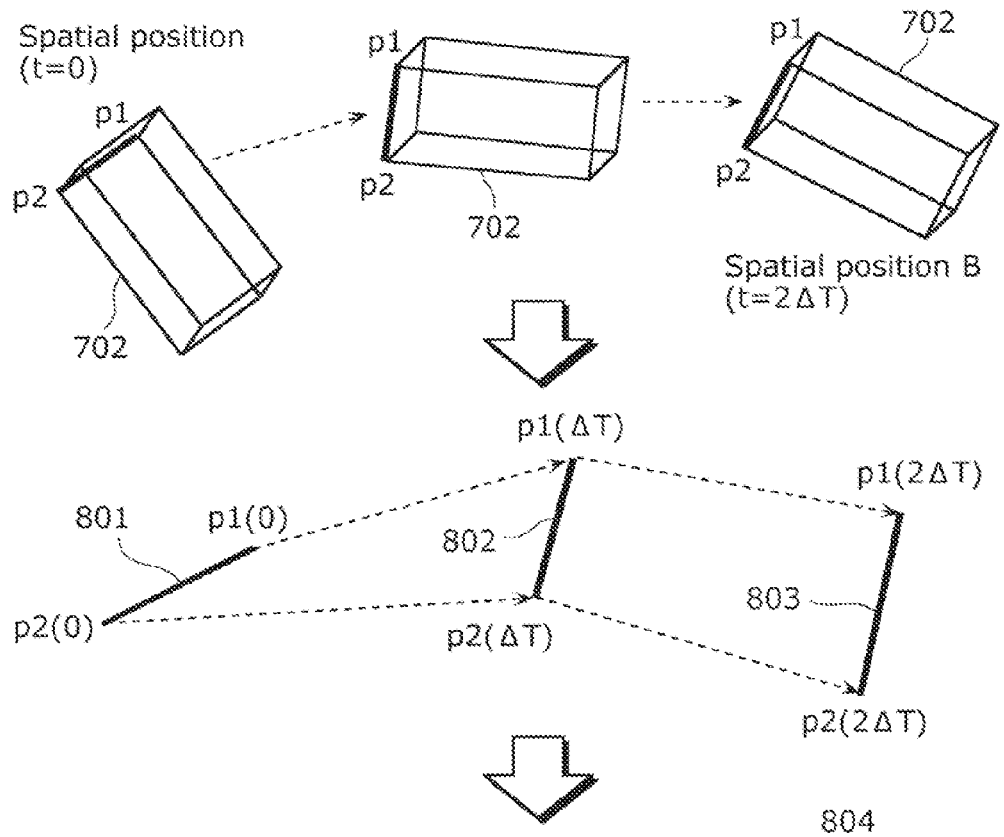
FIG. 8 shows an example of an operation of a three-dimensional region generation unit in Embodiment 1.

FIG. 8 shows an example of an operation of the three-dimensional region generation unit 603 shown in FIG. 6.

The segment approximation model 702 shown in FIG. 8 constitutes part of the movable robot 202. According to the motion planning 501, the segment approximation model 702 then moves from the spatial position A (time t=0) to the spatial position B (time t=2ΔT) with the posture of the segment approximation model 702 being changed.

In order to simplify description without losing generality, attention is paid to line segment p1-p2 constituting the segment approximation model 702 in FIG. 8. Along with the movement of the movable robot 202 from the spatial position A to the spatial position B, the line segment p1-p2 moves from a line segment 801 in the spatial position A to a line segment 803 in the spatial position B. However, the three-dimensional region generation unit 603 samples the motion of the movable robot 202 with a constant time interval ΔT. Accordingly, a line segment 802 in the middle position is also sampled.

Now, as shown in an internal format 804 of the three-dimensional region, a three-dimensional region expressing the motion space is generated. The three-dimensional region generation unit 603 sets the "time" attribute of <polygons> tag to the start time of the motion planning 501. Hereinafter, the time is denoted as [time]:[minute]:[second]. Actually, three-dimensional coordinate values having units are stored in p1(0), p2(0), p1(ΔT), p2(ΔT), p1(2ΔT), and p2(2ΔT) of the internal format 804 of the three-dimensional region.

Figure 9:
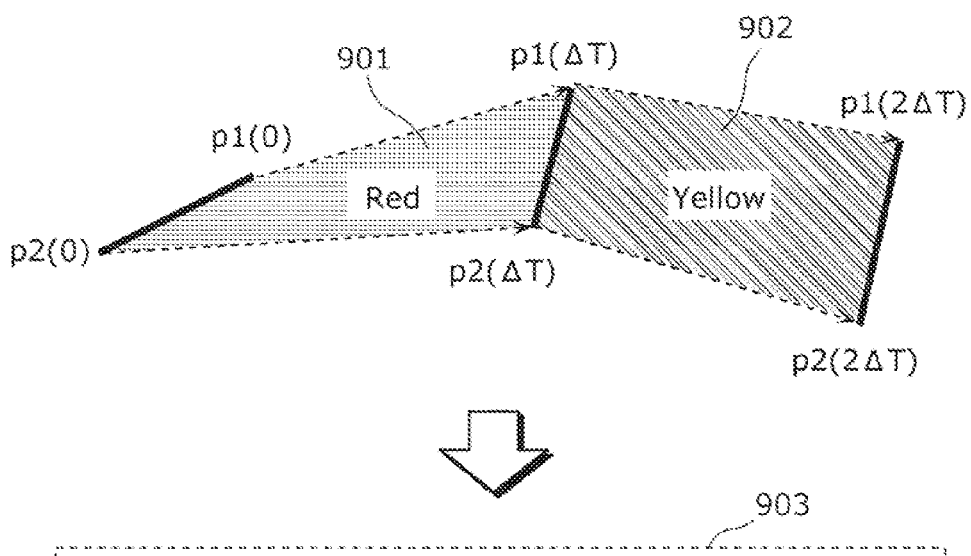
FIG. 9 shows an example of an operation of a region expression adjustment unit in Embodiment 1.

The region expression adjustment unit 103 processes the shape of the three-dimensional region or the texture of two-dimensional planes constituting the three-dimensional region which is outputted by the work area generation unit 102. FIG. 9 shows an example in which the region expression adjustment unit 103 changes the color of each two-dimensional plane constituting the three-dimensional region according to the motion speed of the movable robot 202.

The line segments expressing the three-dimensional region forms polygons including, as the sides thereof, these line segments. A <polygon> tag of an internal format 903 of the three-dimensional region indicates a polygon. The value of the "start" attribute indicates a relative time when the movable robot 202 enters a two-dimensional plane. The value of the "end" attribute indicates a relative time when the movable robot 202 exits a two-dimensional plane. Also, the internal format 903 of the three-dimensional region shown in FIG. 9 is divided into a two-dimensional plane 901 formed by the motion of the movable robot 202 between the times 0 and ΔT, and a two-dimensional plane 902 formed by the motion between the times ΔT and 2ΔT.

And those line segments generated by the trajectory of the motion, among the line segments constituting each two-dimensional plane are expressed by the <line> tag having the "attr" attribute value of "traj." Also, the length of each line segment generated by the trajectory of the motion is proportional to the motion speed.

Also, in the example shown in FIG. 9, the color of the two-dimensional plane 901 including the trajectory indicating fast motion is red, and the value of "color" attribute of the <polygon> tag is "red." The color of the two-dimensional plane 902 including the trajectory indicating slow motion is yellow, and the value of the "color" attribute of the <polygon> tag is "yellow."

The overlay unit 106 extracts a partial three-dimensional region from the three-dimensional region processed by the region expression adjustment unit 103, the partial three-dimensional region being occupied by the movable robot 202 after the current time. More specifically, the overlay unit 106 calculates the current relative time by assuming that the start time of the motion of the movable robot 202 is the initial relative time 00:00:00. The value of "time" attribute of the <polygons> tag then allows only those three-dimensional regions formed after the current relative time to be extracted.

Figure 10:
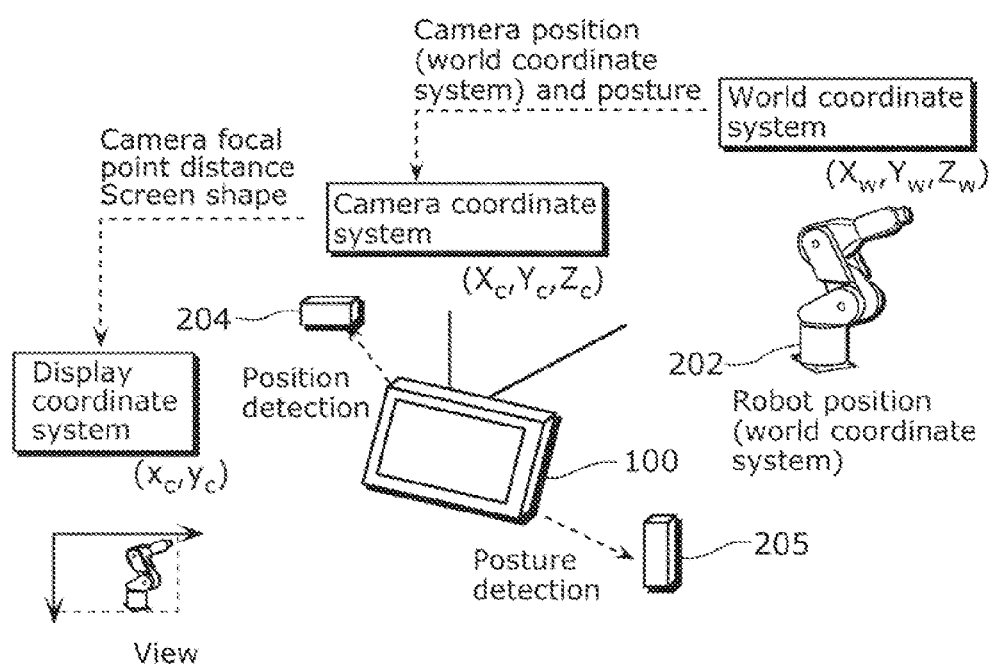
FIG. 10 shows an example of an operation of an overlay unit in Embodiment 1.

The overlay unit 106 superimposes the three-dimensional region as a semi-transparent texture on the real image captured by the camera 301, the three-dimensional region being the motion space of the movable robot 202. FIG. 10 shows an example in which the overlay unit 106 superimposes an image on the real image captured by the camera 301, the image being the three-dimensional region as viewed in the image capture direction from the image capture position.

The position of the movable robot 202 is known. Also, the image capture position and direction of the image capture unit 104 in the real world are traced by the position and posture detection unit 105. The specification (lens focal point distance, the shape of the image capture device) of the camera 301 is known.

The determinant is calculated that is used to transform the motion space of the movable robot 202 to an image by CG (Computer Graphics) processing, the image as viewed in the image capture direction from the image capture position of the image capture unit 104. That is to say, the determinant that is used to transform the world coordinate system (Xw, Yw, Zw) to the display coordinate system (xc, yc) is calculated. The overlay unit 106 projects a three-dimensional region on a two-dimensional plane using the determinant, and superimposes the projected region on the real image including the movable robot 202.

In Embodiment 1, the transparency at the time of superimposing is set to a value proportional to the calculated distance between the image capture position and the position of the movable robot 202.

The distance between the worker 201 and the movable robot 202 approximates to the distance between the image capture position and the movable robot 202, as well as the distance between the motion space presentation device 100 and the movable robot 202. As shown in FIG. 10, the world coordinate Pr of the movable robot 202 is known. The world coordinate Pd(t) of the motion space presentation device 100 at a time t is known by the position sensing device 204. Consequently, the distance d(t) between the worker 201 and the movable robot 202 at the time t is calculated by d(t)=|Pr−Pd(t)|. Then the overlay unit 106 can superimpose the image of the three-dimensional region on the real image according to the calculated distance.

Figure 11:
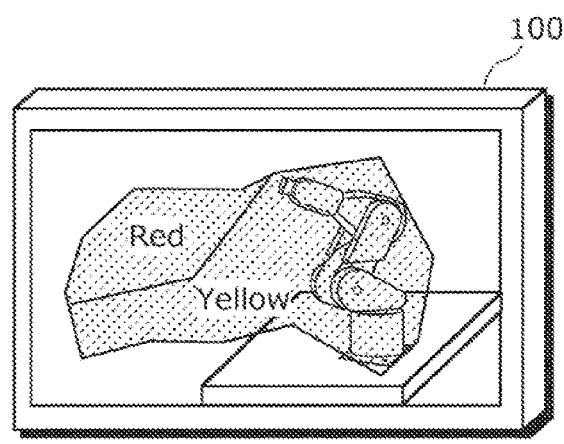
FIG. 11 shows an example of a motion space displayed on the motion space presentation device in Embodiment 1.

With such a configuration, the motion space presentation device 100 presents the motion space as shown in FIG. 11. Thus, the worker 201 can recognize the motion space of the movable robot 202 three-dimensionally as well as intuitively, and thus can avoid a danger such as a collision.

In addition, the closer the distance between the movable robot 202 and the worker 201, the lower the transparency of the superimposed and displayed motion space, and thus the worker 201 can easily recognize the motion space visually. Furthermore, the worker 201 can effectively use the motion space by recognizing a three-dimensional region therein which is not occupied by the movable robot 202, but is within the movable range thereof.

Embodiment 2

An Embodiment 2 is now described. Description of the same components as in Embodiment 1 is omitted. A motion space presentation device in Embodiment 2 also includes the same components as those of the motion space presentation device 100 in Embodiment 1 shown in FIG. 1.

FIG. 12 shows an example of an operation of a region expression adjustment unit in Embodiment 2. In Embodiment 2, a region expression adjustment unit 103 changes the color for showing a three-dimensional region.

First, the region expression adjustment unit 103 makes, as a base, a copy of the internal format of a two-dimensional plane 1201 constituting the three-dimensional region. Next, the region expression adjustment unit 103 changes an internal format 1202 of the three-dimensional region by setting the color of the two-dimensional plane as the base to red, and by setting the color of the copied two-dimensional plane to yellow. Thus, the motion space presentation device 100 can express the motion space with different colors.

FIG. 13 shows an example of a motion space displayed on the motion space presentation device 100 in Embodiment 2. The motion space presentation device 100 displays an image like a display content 1301 at a position far from the movable robot 202, and displays an enlarged image like a display content 1302 at a position close to the movable robot 202. When the motion space presentation device 100 further approaches the movable robot 202, the three-dimensional region is displayed like a display content 1303 in another color.

Here, as shown in Embodiment 1, the distance between the worker 201 and the movable robot 202 can be computed. For example, the overlay unit 106 sets the color of the three-dimensional region to be superimposed to red in the case where the distance d(t) between the worker 201 and the movable robot 202 at time t satisfies d(t)≤Dr where Dr is a threshold value of the maximum range Dr of the movable robot 202. In the case where d(t)>Dr, the overlay unit 106 sets the color of the three-dimensional region to be superimposed to yellow. Thus, the three-dimensional region is displayed as shown in FIG. 13.

Consequently, the worker 201 can perceive the distance between the worker 201 and the motion space of the movable robot 202 by color, and can recognize the motion space of the movable robot 202 more intuitively.

Embodiment 3

An Embodiment 3 is now described. Description of the same components as in Embodiment 1 is omitted. A motion space presentation device in Embodiment 3 also includes the same components as those of the motion space presentation device 100 in Embodiment 1 shown in FIG. 1. In Embodiment 3, the movable robot 202 operates according to a plurality of operation modes defined by a motion planning. The motion space presentation device 100 changes the expression form of the motion space with a operation mode.

FIG. 14 shows an example of a motion planning of a motion planning holding unit 101 in Embodiment 3. A region expression adjustment unit 103 changes the color of a three-dimensional region by switching between the operation modes of the movable robot 202. In Embodiment 3, the movable robot 202 has two operation modes, and operates in an operation mode 1 and then operates in an operation mode 2.

Figure 15:
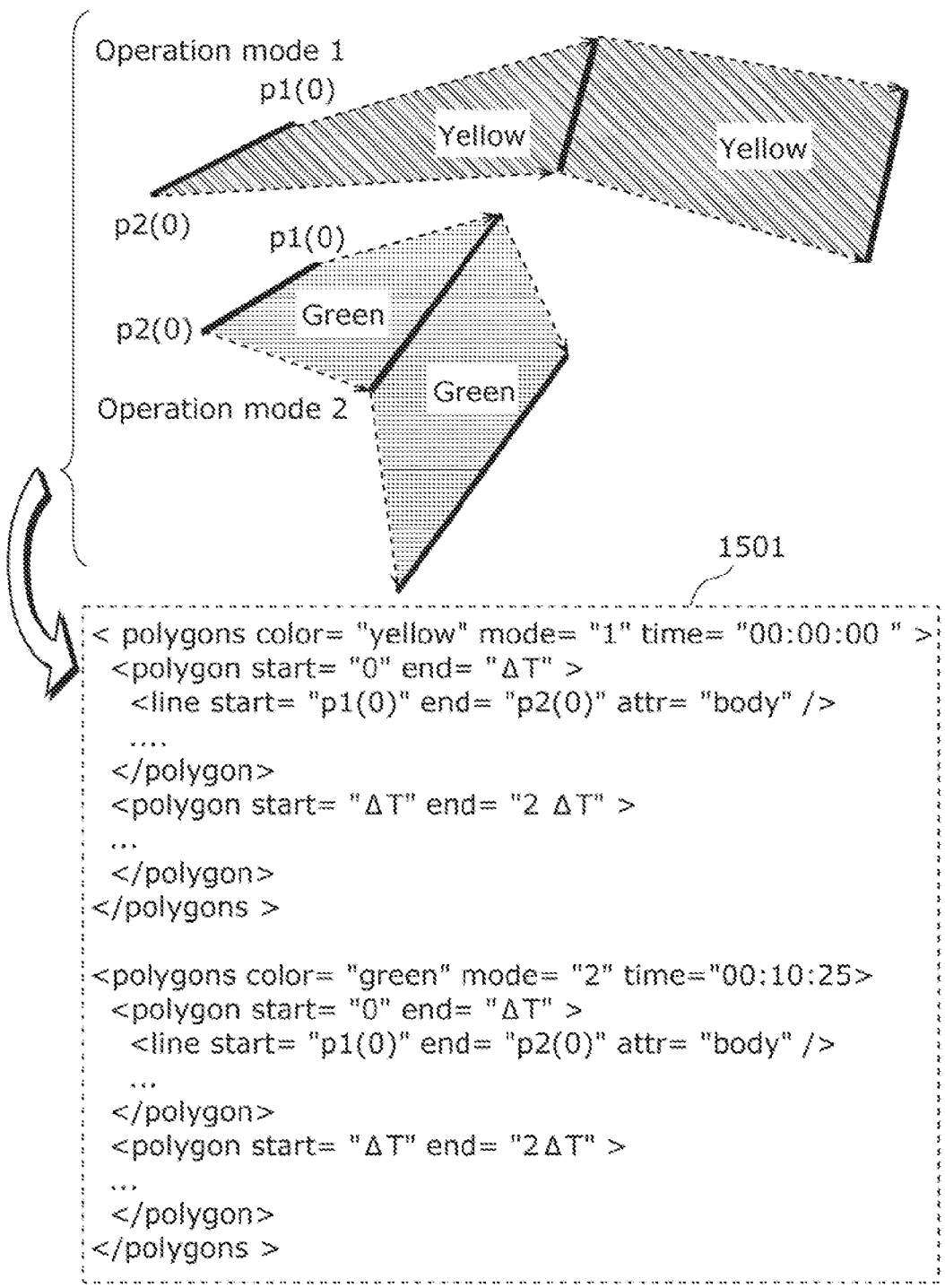
FIG. 15 shows an example of an operation of a region expression adjustment unit in Embodiment 3.

FIG. 15 shows an example of an operation of the region expression adjustment unit 103 in Embodiment 3. As shown in FIG. 15, according to operation modes, respective three-dimensional regions are generated. The three-dimensional region in the operation mode 1 is set as a yellow region, and the "color" attribute of the <polygons> tag corresponding to the operation mode 1 is set to yellow. The three-dimensional region in the operation mode 2 is set as a green region, and the "color" attribute of the <polygons> tag corresponding to the operation mode 1 is set to green. Thus, the color of the three-dimensional region is changed.

Also, an internal format 1501 of the three-dimensional region stores the relative start times of motion in respective operation modes where the start time of the entire motion of the movable robot 202 is 00:00:00. More specifically, these relative times are stored as the value of the "time" attribute of the <polygons> tag.

Figure 16:
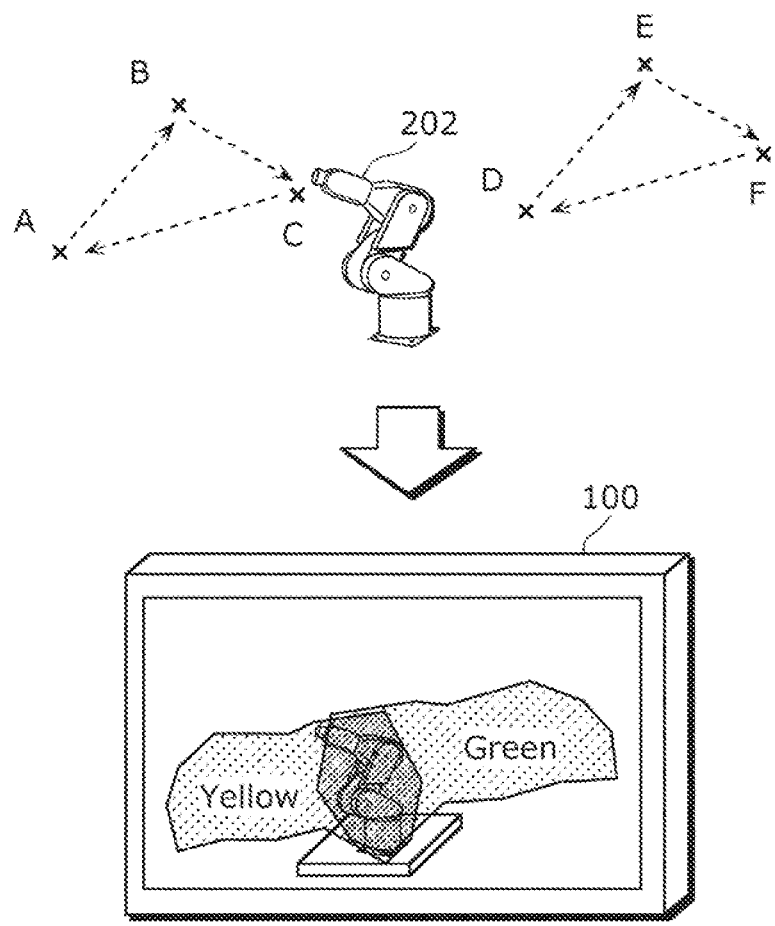
FIG. 16 shows an example of a motion space displayed on a motion space presentation device in Embodiment 3.

FIG. 16 shows an example of a motion space displayed on the motion space presentation device 100 in Embodiment 3. In Embodiment 3, when the worker 201 observes the motion space of the movable robot 202 using the motion space presentation device 100, the three-dimensional region in the current operation mode is displayed in yellow, and the three-dimensional region in the subsequent operation mode is displayed is green.

Thus, with the motion space presentation device 100, the worker 201 can pay attention to avoid approaching the motion space in the current operation mode. Also, with the motion space presentation device 100, the worker 201 can tell that the dangerous area of the motion space in the subsequent operation mode is in the proximity of the worker 201.

Figure 17:
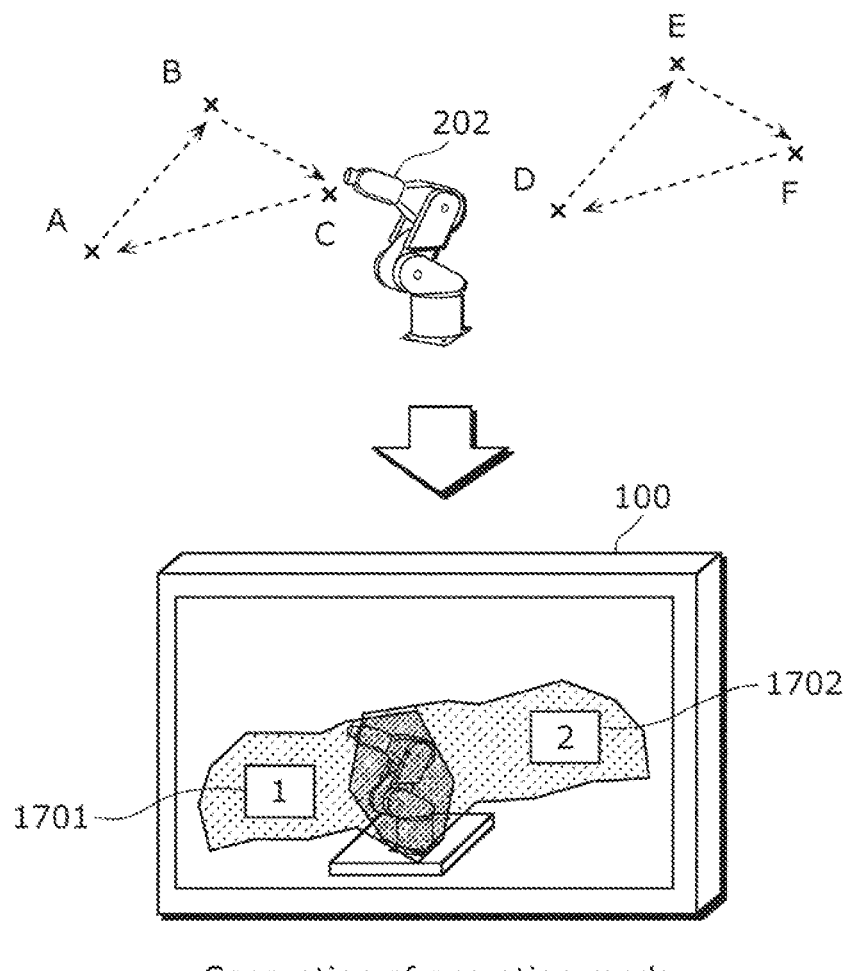
FIG. 17 shows a first modification of the motion space displayed on the motion space presentation device in Embodiment 3.

FIG. 17 shows a first modification of the motion space displayed on the motion space presentation device 100 in Embodiment 3. The overlay unit 106 projects the three-dimensional region on the two-dimensional plane, and then obtains a numerical value from the "mode" attribute of the <polygons> tag, the numerical value indicating the order of operation modes. The overlay unit 106 then further superimposes a numerical value 1701 indicating the order of the current operation mode, and a numerical value 1702 indicating the order of the subsequent operation mode on the two-dimensional plane. Thus, the order of transition of the motion space becomes more recognizable for the worker 201.

Figure 18:
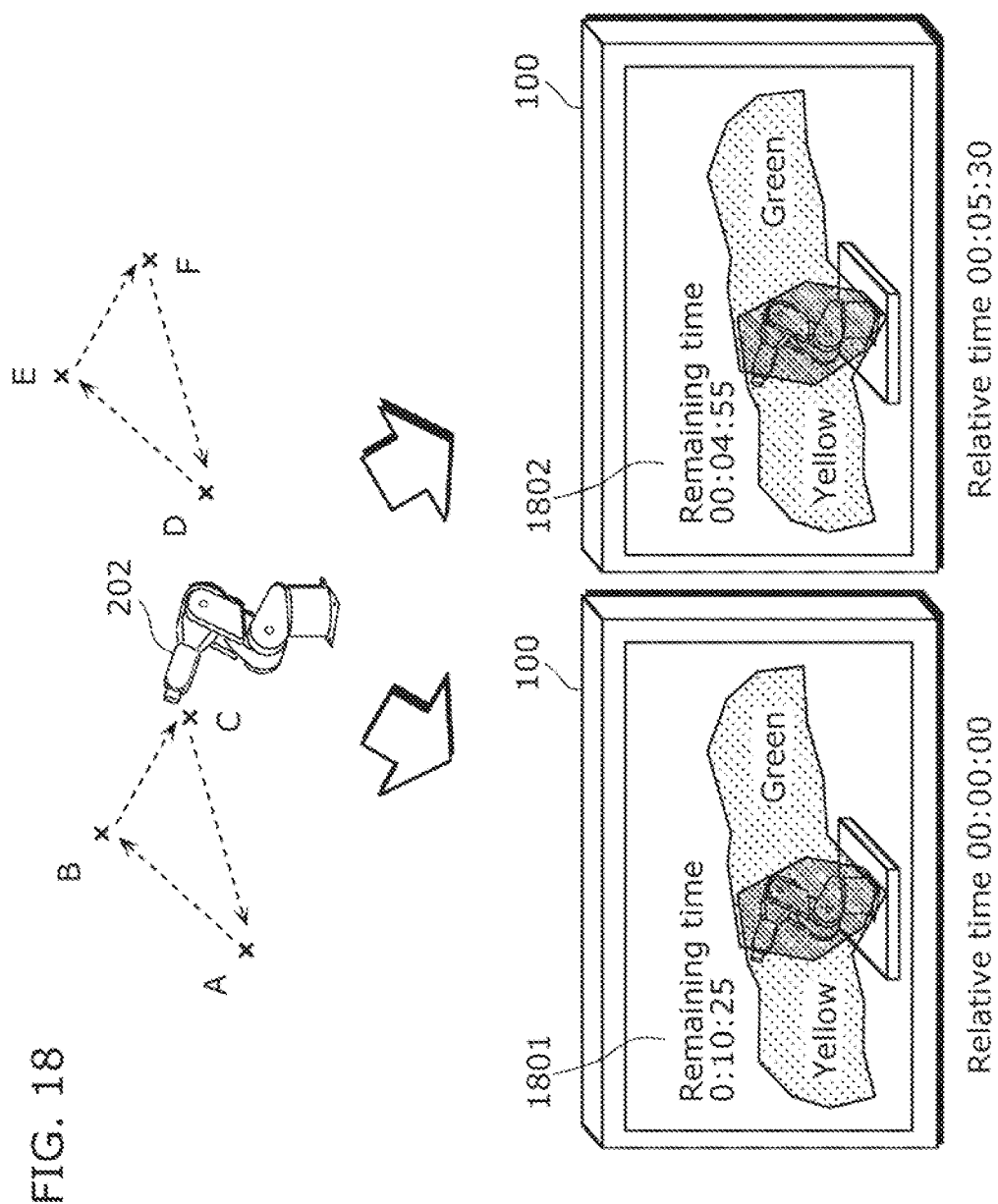
FIG. 18 shows a second modification of the motion space displayed on the motion space presentation device in Embodiment 3.

FIG. 18 shows a second modification of the motion space displayed on the motion space presentation device 100 in Embodiment 3. The overlay unit 106 projects the three-dimensional region on the two-dimensional plane, then obtains the start time of the subsequent operation mode from "time" attribute of the <polygons> tag. The overlay unit 106 then superimposes the difference time between the current time and the start time of the subsequent operation mode on the two-dimensional plane, the difference time indicating the time required to complete the current operation mode. Thus, the time of transition of the motion space becomes more recognizable for the worker 201.

As shown in FIG. 18, at the relative time of 00:00:00 indicating the motion start time of the movable robot 202, 1801 as the time required to complete the operation mode 1 is displayed on the motion space presentation device 100. Also, at the relative time of 00:05:30, 1802 as the time required to complete the operation mode 1 is displayed on the motion space presentation device 100.

As described above, the region expression adjustment unit 103 in Embodiment 3 changes the expression form of the two-dimensional plane constituting the three-dimensional region according to the difference in the modes differentiated in the motion planning. The overlay unit 106 then superimposes the execution sequence and the scheduled completion time on the real image or the image of the three-dimensional region. The place on which the execution sequence and the scheduled completion time are superimposed may be either the real image or the image of the three-dimensional region. For example, the execution sequence may be superimposed in the proximity of the image indicating the motion space corresponding to the operation mode.

Embodiment 4

An Embodiment 4 is now described. Description of the same components as in Embodiment 1 is omitted. A motion space presentation device in Embodiment 4 also includes the same components as those of the motion space presentation device 100 in Embodiment 1 shown in FIG. 1.

Figure 19:
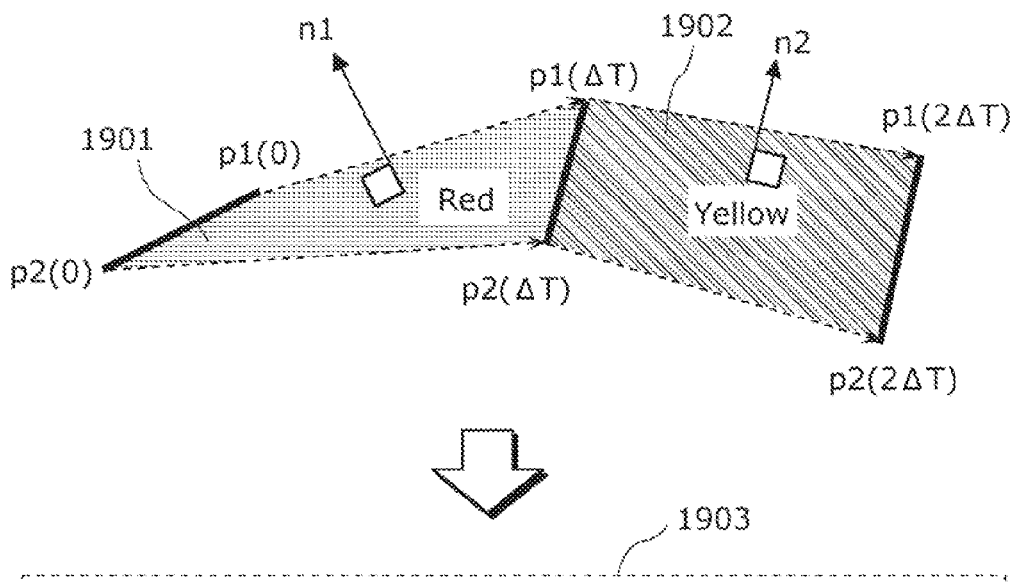
FIG. 19 shows an example of an operation of a region expression adjustment unit in Embodiment 4.

FIG. 19 shows an example of an operation of a region expression adjustment unit 103 in Embodiment 4. The region expression adjustment unit 103 processes the shape of the three-dimensional region or the texture of two-dimensional planes constituting the three-dimensional region which is outputted by the work area generation unit 102. FIG. 19 shows an example in which the region expression adjustment unit 103 changes the color of each two-dimensional plane constituting the three-dimensional region according to the motion speed of the movable robot 202.

The line segments expressing the three-dimensional region forms polygons including, as the sides thereof, these line segments. The <polygon> tag of an internal format 1903 of the three-dimensional region indicates a polygon. The value of the "start" attribute indicates a relative time when the movable robot 202 enters a two-dimensional plane. The value of the "end" attribute indicates a relative time when the movable robot 202 exits a two-dimensional plane. Also, the internal format 1903 of the three-dimensional region shown in FIG. 19 is divided into a two-dimensional plane 1901 formed by the motion of the movable robot 202 between the times 0 and ΔT, and a two-dimensional plane 1902 formed by the motion between the times ΔT and 2ΔT.

And those line segments generated by the trajectory of the motion, among the line segments constituting each two-dimensional plane are expressed by the <line> tag having the "attr" attribute value of "traj." Also, the length of each line segment generated by the trajectory of the motion is proportional to the motion speed.

Also, in the example shown in FIG. 19, the color of the two-dimensional plane 1901 including the trajectory indicating fast motion is red, and the value of "color" attribute of the <polygon> tag is "red." The color of the two-dimensional plane 1902 including the trajectory indicating slow motion is yellow, and the value of the "color" attribute of the <polygon> tag is "yellow."

Also, the region expression adjustment unit 103 calculates the unit normal vector of each two-dimensional plane and adds the unit normal vector to the attribute of the polygon. The added unit normal vector is stored in "norm" attribute of the <polygon> tag of the internal format 1903 of the three-dimensional region. Actually, three-dimensional coordinate values having units are written in n1 and n2 of the internal format 1903 of the three-dimensional region shown in FIG. 19.

For all adjacent two-dimensional planes i, j of the three dimensional region outputted by the region expression adjustment unit 103, the overlay unit 106 calculates the angle $\theta_{ij}$ formed by the planes i, j. The overlay unit 106 then calculates $n(\theta_{ij} < \theta_{th})$ which is the number of angles $\theta_{ij}$ such that $\theta_{ij} < \theta_{th}$ where $\theta_{th}$ is a predetermined threshold value. The overlay unit 106 then calculates the value of $n(\theta_{ij} < \theta_{th})/n(\theta_{ij})$ where $n(\theta_{ij})$ is the number of all angles with no restriction.

When the calculated value of $n(\theta_{ij} < \theta_{th})/n(\theta_{ij})$ is greater than or equal to a predetermined threshold value pth, the overlay unit 106 determines that the three-dimensional region outputted by the region expression adjustment unit 103 has a smooth surface with less undulations. When the three-dimensional region has no smooth surface or the distance between the worker 201 and the movable robot 202 is greater than or equal to a predetermined threshold value dth, the overlay unit 106 superimposes the three-dimensional region outputted by the region expression adjustment unit 103 on the two-dimensional plane. When the three-dimensional region has a smooth surface and the distance between the worker 201 and the movable robot 202 is less than a predetermined threshold value dth, the overlay unit 106 superimposes a piecewise linearly approximated shape of the movable robot 202 on the two-dimensional plane.

Figure 20:
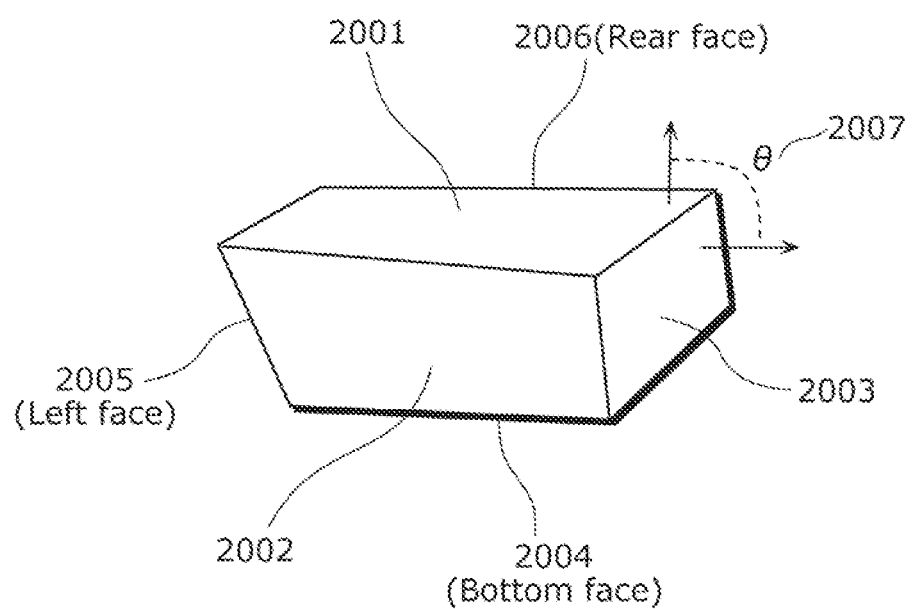
FIG. 20 shows an example of a three-dimensional region in Embodiment 4.

More specifically, for example, in the case where the three-dimensional region is a hexahedron which consists of 6 two-dimensional planes 2001 to 2006 as shown in FIG. 20, there are 12 pairs of adjacent two-dimensional planes as shown below. That is to say $n(\theta ij)=12$.

(two-dimensional plane 2001, two-dimensional plane 2002)
(two-dimensional plane 2001, two-dimensional plane 2003)
(two-dimensional plane 2001, two-dimensional plane 2005)
(two-dimensional plane 2001, two-dimensional plane 2006)
(two-dimensional plane 2002, two-dimensional plane 2005)
(two-dimensional plane 2002, two-dimensional plane 2003)
(two-dimensional plane 2003, two-dimensional plane 2006)
(two-dimensional plane 2005, two-dimensional plane 2006)
(two-dimensional plane 2004, two-dimensional plane 2002)
(two-dimensional plane 2004, two-dimensional plane 2003)
(two-dimensional plane 2004, two-dimensional plane 2006)
(two-dimensional plane 2004, two-dimensional plane 2005)

The overlay unit 106 calculates the angle $\theta ij$ formed by each pair of two-dimensional planes by applying the inverse function of cosine to the inner product of the normal vectors of the two-dimensional planes. For example, an angle 2007 formed by the two-dimensional plane 2001 and the two-dimensional plane 2003 is $\theta$. Here, it is assumed that the threshold values $\theta$th and pth are set such that $\theta$th=30 [deg] and pth=0.3. In the case where $n(\theta ij<\theta th)=4$, $n(\theta ij<\theta th)/n(\theta ij)=4/12=1/3>$pth is satisfied.

Consequently, the overlay unit 106 determines that the three-dimensional region has a smooth surface. Consequently, when the distance between the worker 201 and the movable robot 202 is less than a predetermined threshold value dth, the overlay unit 106 extracts a piecewise linearly approximated shape of the movable robot 202 from the three-dimensional region outputted by the region expression adjustment unit 103, and superimposes the piecewise linearly approximated shape on the two-dimensional plane.

More specifically, the extraction of the piecewise linearly approximated shape of the movable robot 202 is achieved in the following manner:

First, the overlay unit 106 calculates the current relative time by assuming that the start time of the motion of the movable robot 202 is the initial relative time 00:00:00. Next, the overlay unit 106 extracts those line segments (<line> tag) for which the value of the "time" attribute of the <polygons> tag only includes a specific time after the current relative time (for example, the time after $\Delta T$ has elapsed from the current relative time). Subsequently, the overlay unit 106 reconstructs the two-dimensional planes constituting the segment approximation model 702 by determining the connection relationship between segments based on a shared point.

Alternatively, the overlay unit 106 may reconstruct the two-dimensional planes constituting the segment approximation model 702 by extracting the line segments at a plurality of times.

The overlay unit 106 superimposes the image of the segment approximation model 702 on the real image according to a predetermined condition, the image of the segment approximation model 702 as viewed in the image capture direction from the image capture position of the image capture unit 104.

Figure 21:
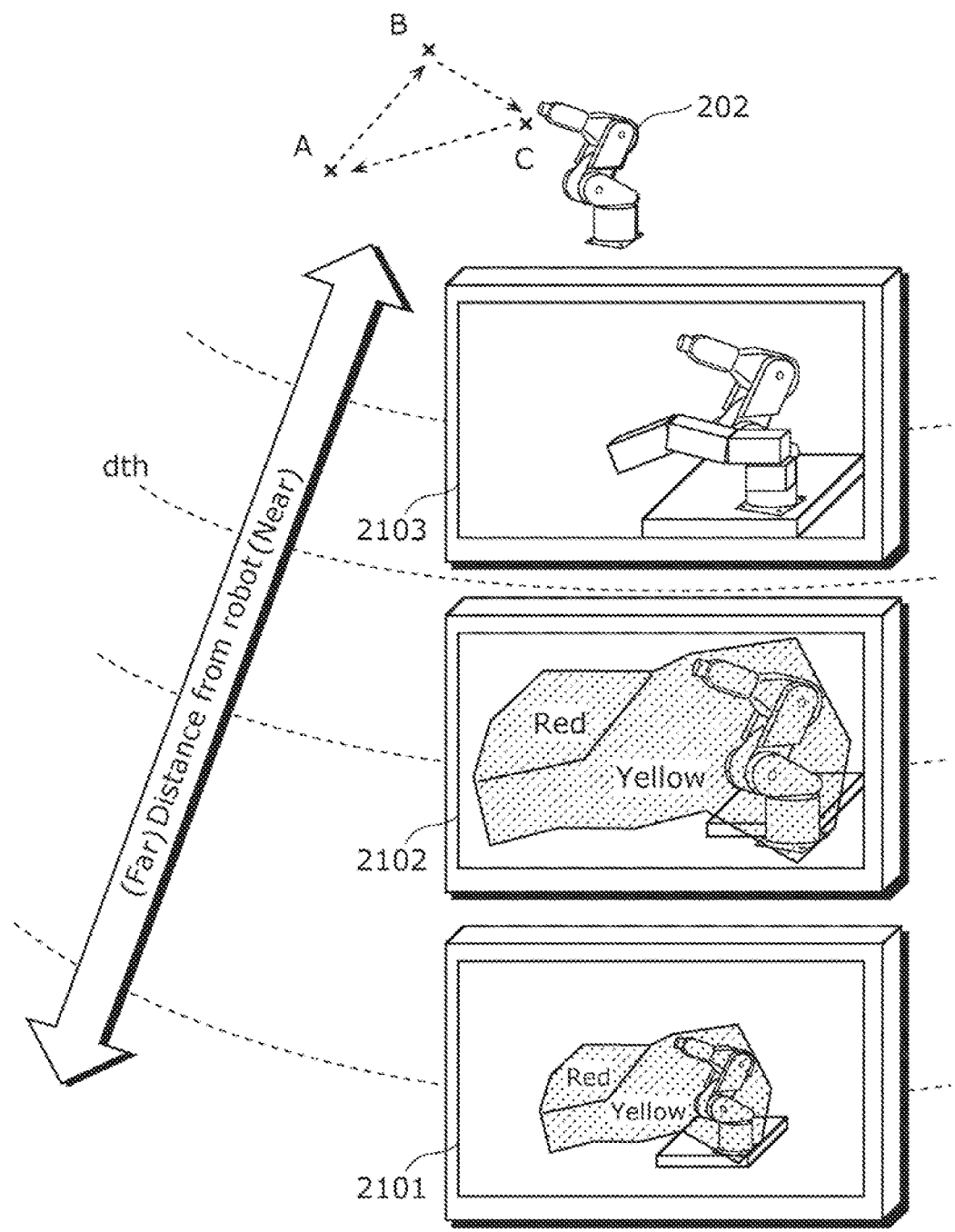
FIG. 21 shows an example of a motion space displayed on a motion space presentation device in Embodiment 4.

FIG. 21 shows an example of a motion space displayed on the motion space presentation device 100 in Embodiment 4.

When the motion space presentation device 100 is far from the movable robot 202, the motion space presentation device 100 displays an image like display content 2101. On the other hand, when the motion space presentation device 100 is near the movable robot 202, the motion space presentation device 100 displays an enlarged image like display content 2102.

When the motion space presentation device 100 is even closer to the movable robot 202, and the three dimensional region has a smooth surface, it is difficult for the worker 201 to recognize the motion space intuitively. For this reason, the motion space presentation device 100 is automatically switched to a mode in which a piecewise linearly approximated shape of the movable robot 202 is displayed. The motion space presentation device 100 then displays an image like display content 2103. Thus, the worker 201 can recognize the motion space of the movable robot 202 more intuitively.

Here, as shown in Embodiment 1, the distance between the worker 201 and the movable robot 202 can be computed. For example, the threshold value dth used for comparison may be the maximum range Dr of the movable robot 202. That is to say, the threshold value dth may be set such that dth=Dr. Thus, the three-dimensional region is displayed as shown in FIG. 21.

In Embodiment 4, the overlay unit 106 superimposes either the image of the segment approximation model or the image of the three-dimensional region on the real image according to the smoothness and the distance, but may do so according to either the smoothness or the distance.

For example, the overlay unit 106 may determine to superimpose either the image of the segment approximation model or the image of the three-dimensional region on the real image according to the smoothness of the three-dimensional region. In this case, the overlay unit 106 when evaluating that the three-dimensional region has a smooth surface, may superimpose the image of the segment approximation model on the real image, and the overlay unit 106 when evaluating that the three-dimensional region has no smooth surface, may superimpose the image of the three-dimensional region on the real image.

Alternatively, the overlay unit 106 may determine to superimpose either the image of the segment approximation model or the image of the three-dimensional region on the real image according to only the distance between the image capture position and the movable robot 202. In this case, when the distance between the image capture position and the movable robot 202 satisfies a predetermined condition, the overlay unit 106 may superimpose the image of the segment approximation model on the real image, otherwise the overlay unit 106 may superimpose the image of the three-dimensional region on the real image.

The overlay unit 106 may superimpose either the image of the segment approximation model or the image of the three-dimensional region on the real image by separately provided switching means.

In Embodiment 4, the region expression adjustment unit 103 calculates the unit normal vector of each two-dimensional plane, however, the work area generation unit 102 may calculate the unit normal vector. Thus, without the region expression adjustment unit 103, the overlay unit 106 can evaluate the smoothness of the three-dimensional region, and can selectively superimpose the image of the segment approximation model or the three-dimensional region on the real image.

Embodiment 5

An Embodiment 5 is now described. Description of the same components as in Embodiment 1 is omitted.

Figure 22:
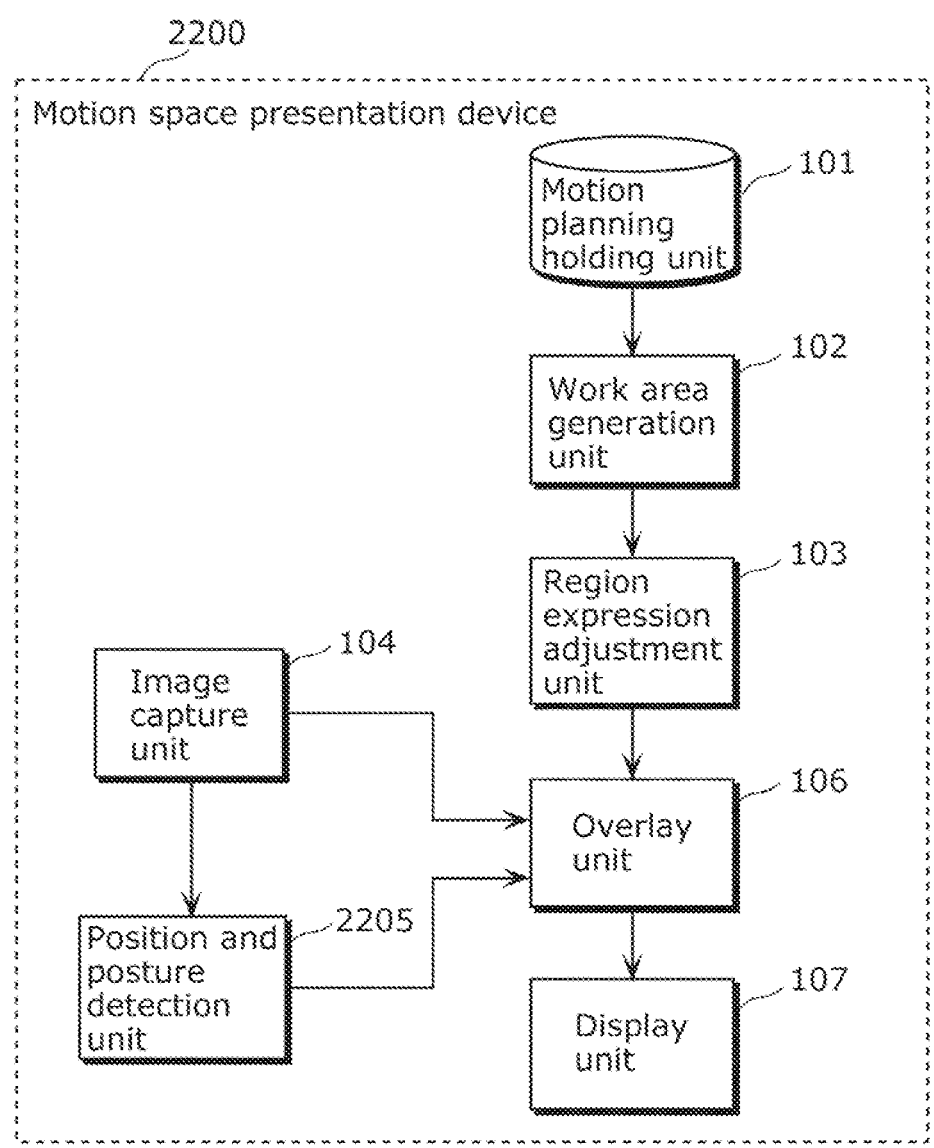
FIG. 22 shows a functional block diagram of a motion space presentation device in Embodiment 5.

FIG. 22 shows a functional block diagram of a motion space presentation device in Embodiment 5. A position and posture detection unit 2205 detects the image capture position and direction of the image capture unit 104 from the real world image captured by the image capture unit 104.

Figure 23:
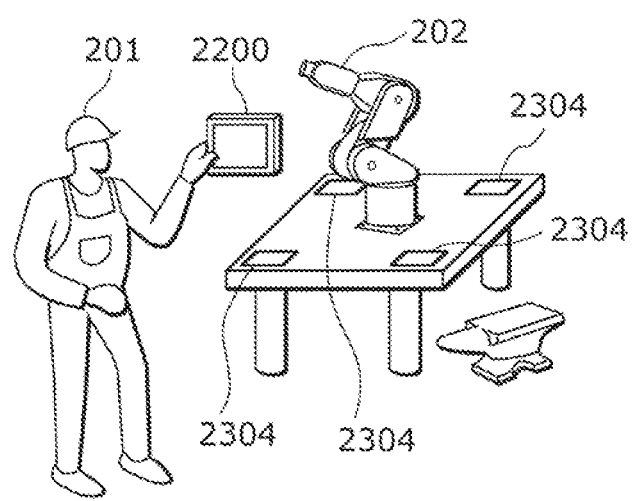
FIG. 23 shows how the motion space presentation device in Embodiment 5 is used.

FIG. 23 shows how a motion space presentation device 2200 shown in FIG. 22 is used.

The motion space presentation device 2200 is used in an environment where the worker 201 and the movable robot 202 perform their tasks in close proximity to each other. The motion planning holding unit 101, the work area generation unit 102, the region expression adjustment unit 103, the position and posture detection unit 2205, and the overlay unit 106 are mounted on the motion space presentation device 2200 as electronic circuits thereof. The image capture unit 104 and the display unit 107 are mounted on the surface of the motion space presentation device 2200. A visual tag 2304 is utilized when the position and posture detection unit 2205 detects the image capture position and direction.

Figure 24:
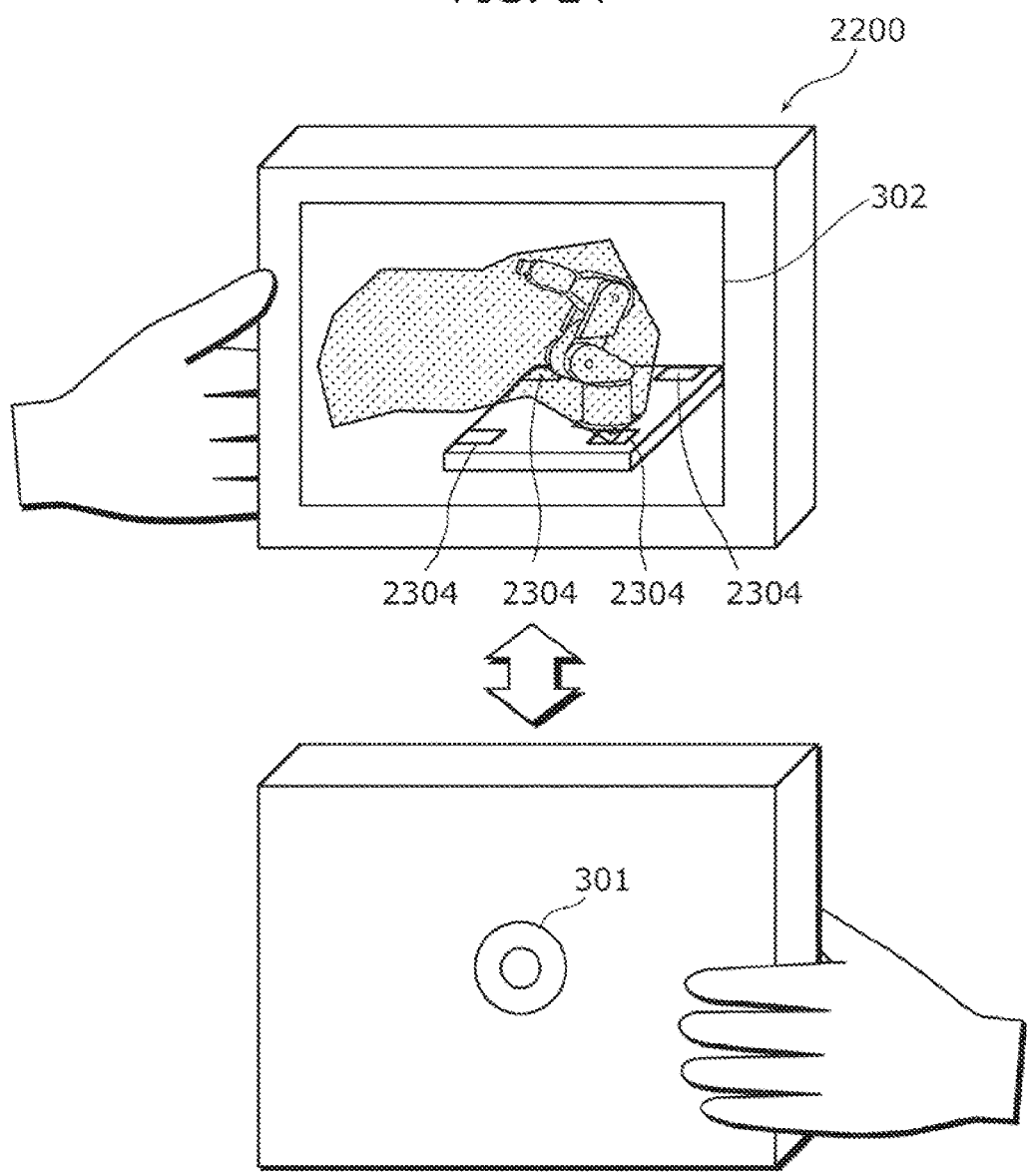
FIG. 24 shows the appearance of the motion space presentation device in Embodiment 5.

FIG. 24 shows the appearance of the motion space presentation device 2200 shown in FIG. 22.

The motion space presentation device 2200 includes the camera 301 which captures the real world image, and the display screen 302 which displays an image formed by superimposing the three-dimensional region on the real world image. The display screen 302 may be achieved with the size of a device such as a cellular phone or PDA (Personal Digital Assistant), which can be held by the worker 201 in his/her hand. Also, the display screen 302 has the size on the order of the size of an eyeglass lens, and may be achieved as a head mount display with ocular lenses being attached.

The visual tag 2304 is captured by the image capture unit 104, and is displayed on the display screen 302. The position and posture detection unit 2205 detects the image capture position and direction of the image capture unit 104 by using the captured visual tag 2304.

Figure 25:
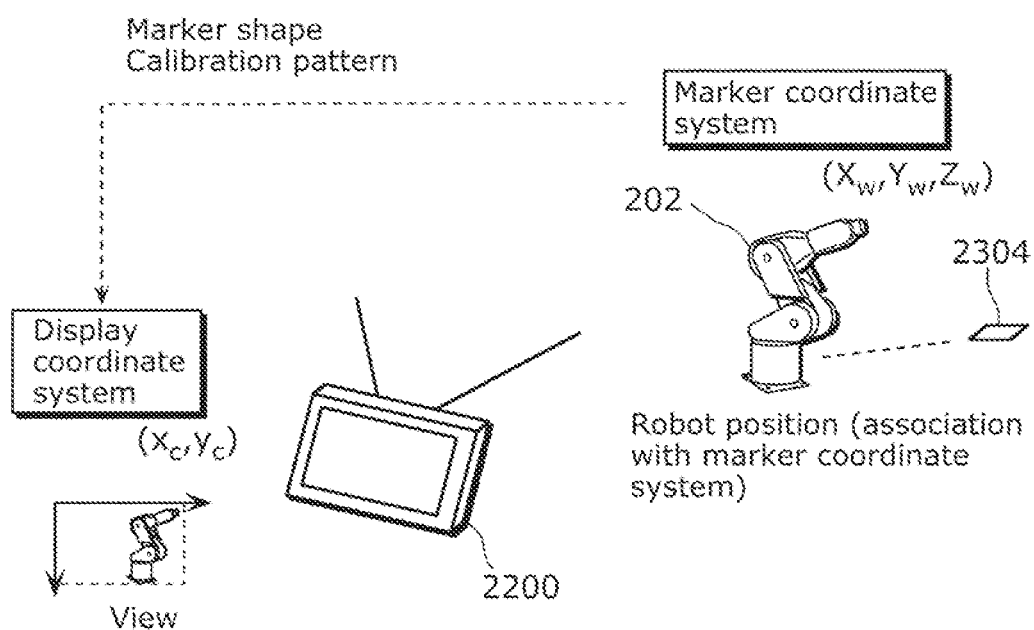
FIG. 25 shows an example of an operation of an overlay unit in Embodiment 5.

FIG. 25 shows an example of the operation of the overlay unit 106 shown in FIG. 22. The overlay unit 106 projects a three-dimensional region on a two-dimensional plane using the visual tag 2304.

Specifically, pre-calibrated visual tag 2304 is arranged so as to be included in the image capture range of the camera 301. The overlay unit 106 then projects the three-dimensional region as a semi-transparent texture on the image of the real world captured by the camera 301. For the transformation between coordinate systems, an image processing tool (such as ARToolKit), which associates each point in the display coordinate system with the corresponding point in the marker coordinate system, is used. The points in the marker coordinate system and the display coordinate system are easily associated with each other by e.g., calibration.

Consequently, once the visual tag 2304 is associated with the corresponding point in the marker coordinate system, when the visual tag 2304 is captured, the overlay unit 106 can determine the determinant which transforms the marker coordinate system (Xm, Ym, Zm) to the display coordinate system (xc, yc). The overlay unit 106 projects the three-dimensional region on the two-dimensional plane using the determinant, and superimposes the projected region on the real world image.

Embodiment 6

An Embodiment 6 is now described. Description of the same components as in Embodiment 1 is omitted.

Figure 26:
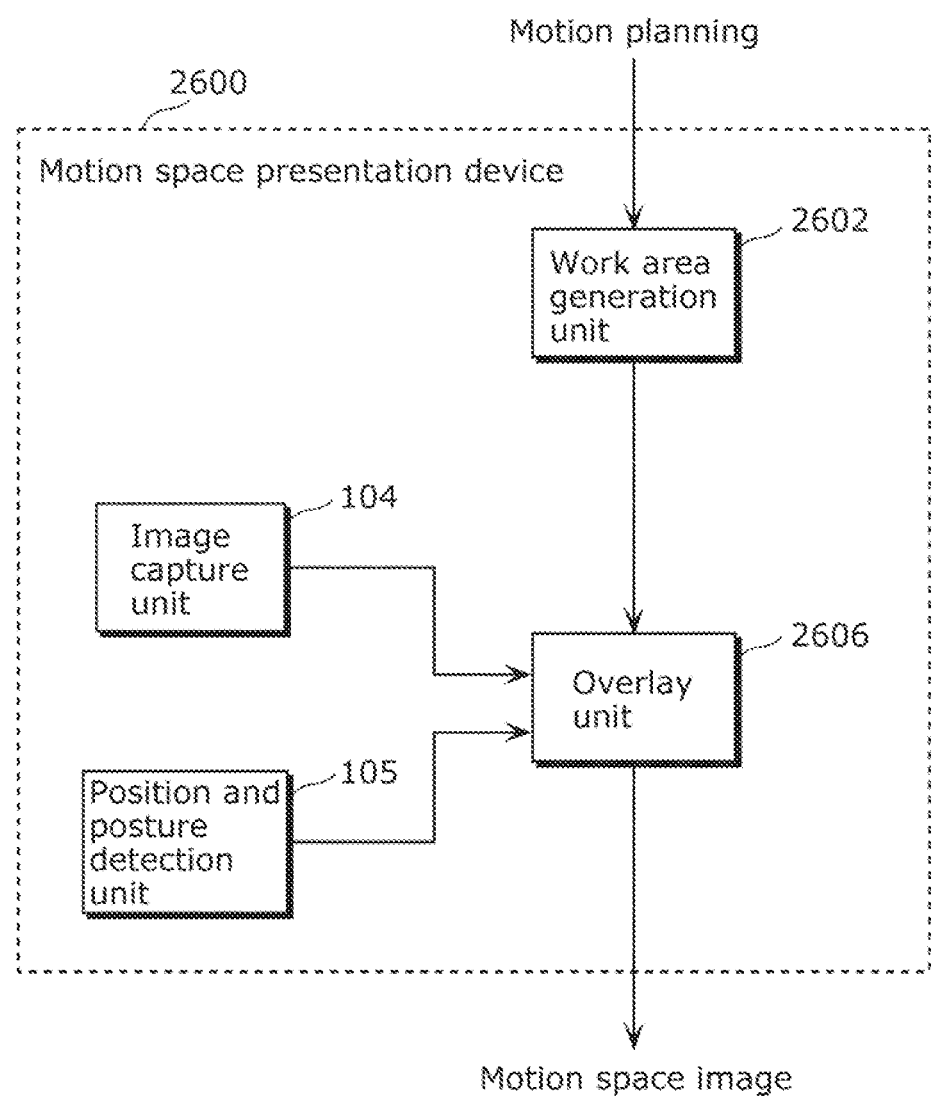
FIG. 26 shows a functional block diagram of a motion space presentation device in Embodiment 6.

FIG. 26 shows a functional block diagram of a motion space presentation device in Embodiment 6.

A motion space presentation device 2600 includes a work area generation unit 2602, the image capture unit 104, the position and posture detection unit 105, and an overlay unit 2606.

The work area generation unit 2602 obtains the motion planning of the movable robot 202 via, for example, a communication network. Thus, without the motion planning holding unit 101 shown in Embodiment 1, the work area generation unit 2602 can generate a three-dimensional region according to the motion planning of the movable robot 202.

The image capture unit 104 captures a real image. That is to say, the image capture unit 104 captures a subject to generate its real image. The position and posture detection unit 105 detects the image capture position and direction of the image capture unit 104. The position and posture detection unit 105 may utilize the visual tag 2304 shown in Embodiment 5 in order to detect the image capture position and direction.

The overlay unit 2606 obtains the three-dimensional region generated by the work area generation unit 2602, and calculates the work area image which is the image of the three-dimensional region as viewed in the image capture direction from the image capture position of the image capture unit 104. The overlay unit 2606 then superimposes the calculated work area image on the real image captured by the image capture unit 104. The superimposed data is then outputted externally. The outputted data is displayed, for example, by an external display means.

That is to say, the motion space presentation device 2600 can generate the data for three-dimensionally displaying the motion space of the movable robot 202 without the motion planning holding unit 101, the region expression adjustment unit 103, or the display unit 107 shown in Embodiment 1 included in the motion space presentation device 2600. The generated data is displayed as a three-dimensionally displayed image of the motion space, for example, by an external display means. Thus, the worker 201 can recognize the motion space of the movable robot 202 intuitively.

The overlay unit 2606 may selectively superimpose either the segment approximation model image or the work area image on the real image according to the difficulty in recognizing each image, the segment approximation model image being the image of the segment approximation model of the movable robot 202, as viewed in the image capture direction from the image capture position. For example, when the work area image is found to be difficult to recognize according to criteria for evaluating the difficulty in recognition, the overlay unit 2606 superimposes the segment approximation model image on the real image. Thus, data for achieving more easily-recognized display is generated.

Specifically, when the distance between the image capture position and the movable robot 202 is too short, the work area image is difficult to recognize. Also, when the motion space of the movable robot 202 has a smooth surface, it is difficult for the worker 201 to recognize the motion space intuitively. That is to say, the work area image is difficult to recognize even in this case. Thus, the overlay unit 2606 may perform the evaluation of difficulty in recognition by using such evaluation criteria that whether or not the distance between the image capture position and the movable robot 202 is short, or whether or not the three-dimensional region generated by the work area generation unit 2602 has a smooth surface.

As shown in a plurality of embodiments above, the motion space presentation device according to one aspect of the present invention can generate data for three-dimensionally displaying the motion space of a movable robot, which is created according to a motion planning. The generated data is displayed as a three-dimensionally displayed image of the motion space by an external display means. Thus, the worker can recognize the motion space of the movable robot intuitively.

These embodiments are just examples and the present invention is not limited to the embodiments. The modifications implemented by making changes, which occur to those skilled in the art, to these embodiments, and other modifications implemented by arbitrarily combining the components of the embodiments are also capable of generating the data for three-dimensionally displaying the motion space, and are thus included in the scope of the present invention.

Also, the present invention can be achieved not only as a motion space presentation device, but also as a method including the steps which are defined by the respective operations of the processing means constituting the motion space presentation device. Also, the present invention can be achieved as a program which causes a computer to execute the steps included in the method. Furthermore, the present invention can be achieved as a computer-readable storage medium such as a CD-ROM in which the program is stored. Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The motion space presentation device according to one aspect of the present invention can generate data for three-dimensionally displaying motion space, and is useful for avoiding a collision with robots on a shop floor such as a cell production site where work is done in close cooperation with the robots. Also, the motion space presentation device according to one aspect of the present invention can be applied as a tool to a presentation of the operation of the robot.

What is claimed is:

1. A motion space presentation device which generates data for presenting a motion space of a movable robot, said motion space presentation device comprising:
a work area generation unit configured to generate a three-dimensional region in which the movable robot operates;
an image capture unit configured to capture a real image;
a position and posture detection unit configured to detect an image capture position which is a position of said image capture unit, and to detect an image capture direction of said image capture unit; and
an overlay unit configured to selectively superimpose either a segment approximation model image or a work area image on the real image captured by said image capture unit, according to difficulty in recognizing each image, the segment approximation model image being an image of a segment approximation model of the movable robot, as viewed in the image capture direction from the image capture position, and the work area image being an image of the three-dimensional region, as viewed in the image capture direction from the image capture position.

2. The motion space presentation device according to claim 1,
wherein said overlay unit is configured to superimpose the segment approximation model image on the real image when said overlay unit evaluates that the work area image is difficult to be recognized according to criteria for evaluating the difficulty in recognition.

3. The motion space presentation device according to claim 1,
wherein said work area generation unit includes:
a segment approximation model holding unit configured to hold the segment approximation model of the movable robot;
a motion simulator configured to simulate a movement of the segment approximation model in a virtual space according to a motion planning for operating the movable robot; and
a three-dimensional region generation unit configured to generate the three-dimensional region in which the movable robot operates, based on a result obtained by simulating the movement of the segment approximation model by said motion simulator.

4. The motion space presentation device according to claim 3,
wherein said overlay unit is configured to superimpose either the segment approximation model image or the work area image on the real image according to at least one of smoothness of the three-dimensional region and a distance between the image capture position and the position of the movable robot, the segment approximation model image being an image of the segment approximation model simulated by said motion simulator, as viewed in the image capture direction from the image capture position.

5. The motion space presentation device according to claim 4,
wherein said overlay unit is configured to superimpose the segment approximation model image on the real image when estimating that the three-dimensional region has a smooth surface, and to superimpose the work area image on the real image when estimating that the three-dimensional region has no smooth surface.

6. The motion space presentation device according to claim 4,
wherein said overlay unit is configured to superimpose the segment approximation model image on the real image when the distance between the image capture position and the position of the movable robot satisfies a predetermined condition, and to superimpose the work area image on the real image when the distance between the image capture position and the position of the movable robot does not satisfy the predetermined condition.

7. The motion space presentation device according to claim 3, further comprising
a region expression adjustment unit configured to change an expression form of the three-dimensional region generated by said work area generation unit.

8. The motion space presentation device according to claim 7,
wherein said region expression adjustment unit is configured to change an expression form of a two-dimensional plane constituting the three-dimensional region based on an amount of movement of the movable robot per unit of time during which the movable robot operates in the three-dimensional region according to the motion planning.

9. The motion space presentation device according to claim 7,
wherein said region expression adjustment unit is configured to change an expression form of a two-dimensional plane constituting the three-dimensional region according to a difference in modes differentiated in the motion planning.

10. The motion space presentation device according to claim 9,
wherein said overlay unit is further configured to superimpose an execution sequence of the mode on at least one of the work area image and the real image, the execution sequence being determined according to the motion planning.

11. The motion space presentation device according to claim 9,
wherein said overlay unit is further configured to superimpose a scheduled completion time of the mode currently executed on at least one of the work area image and the real image.

12. The motion space presentation device according to claim 1,
wherein when the distance between the image capture position and the position of the movable robot is a second length shorter than a first length, said overlay unit is configured to reduce a transparency of the work area image to less than another transparency of the work area image when the distance between the image capture position and the position of the movable robot is the first length, and to superimpose the work area image on the real image.

13. The motion space presentation device according to claim 1,
wherein said work area generation unit is configured to generate the three-dimensional region by associating a partial region in which the movable robot operates in the three-dimensional region with a time at which the movable robot operates in the three-dimensional region,
said overlay unit is configured to extract the partial region from the three-dimensional region, the partial region in which the movable robot operates after current time, and to superimpose an image of the extracted partial region as the work area image on the real image, the image of the extracted partial region as viewed in the image capture direction from the image capture position.

14. The motion space presentation device according to claim 1,
wherein said position and posture detection unit is configured to detect the image capture position and the image capture direction by a visual tag captured by said image capture unit, the visual tag indicating a position.

15. The motion space presentation device according to claim 1, further comprising
a display unit configured to move integrally with said image capture unit, wherein said display unit is configured to display the work area image which is superimposed on the real image by said overlay unit.

16. The motion space presentation device according to claim 1, further comprising
a motion planning holding unit configured to hold a motion planning for operating the movable robot, wherein said work area generation unit is configured to generate the three-dimensional region according to the motion planning held by said motion planning holding unit.

17. A motion space presentation method for generating data for presenting a motion space of a movable robot, the motion space presentation method comprising:
generating a three-dimensional region in which the movable robot operates;
detecting an image capture position which is a position of an image capture unit, and detecting an image capture direction of the image capture unit; and
selectively superimposing either a segment approximation model image or a work area image on the real image captured by the image capture unit, according to difficulty in recognizing each image, the segment approximation model image being an image of a segment approximation model of the movable robot, as viewed in the image capture direction from the image capture position, and the work area image being an image of the three-dimensional region as viewed in the image capture direction from the image capture position.

18. A non-transitory computer-readable recording medium in which a program to generate data for presenting a motion space of a movable robot is recorded, the program causing a computer to execute:
generating a three-dimensional region in which the movable robot operates;
detecting an image capture position which is a position of an image capture unit, and detecting an image capture direction of the image capture unit; and
selectively superimposing either a segment approximation model image or a work area image on the real image captured by the image capture unit, according to difficulty in recognizing each image, the segment approximation model image being an image of a segment approximation model of the movable robot, as viewed in the image capture direction from the image capture position, and the work area image being an image of the three-dimensional region as viewed in the image capture direction from the image capture position.

* * * * *